United States Patent
Shinohara et al.

(10) Patent No.: US 7,121,709 B2
(45) Date of Patent: Oct. 17, 2006

(54) SURFACE LIGHT SOURCE DEVICE, DIFFUSION PLATE AND LIQUID CRYSTAL DISPLAY DEVICE

(75) Inventors: Masayuki Shinohara, Nagaokakyo (JP); Tetsuya Minobe, Kusatsu (JP); Isao Makuta, Kusatsu (JP); Yoshihiro Ueno, Kusatsu (JP); Mamoru Yabe, Kusatsu (JP)

(73) Assignee: Omron Corporation, Kyoto (JP)

( * ) Notice: Subject to any disclaimer, the term of this patent is extended or adjusted under 35 U.S.C. 154(b) by 125 days.

(21) Appl. No.: 10/340,571

(22) Filed: Jan. 10, 2003

(65) Prior Publication Data
US 2003/0137824 A1 Jul. 24, 2003

(30) Foreign Application Priority Data
Jan. 23, 2002 (JP) .............................. 2002-014508

(51) Int. Cl.
*G02B 6/00* (2006.01)

(52) U.S. Cl. ...................... 362/606; 362/612; 362/626; 362/330; 362/339

(58) Field of Classification Search .................. 362/31, 362/330, 331, 337, 26, 606, 607, 611, 612, 362/626, 339
See application file for complete search history.

(56) References Cited

U.S. PATENT DOCUMENTS

2002/0163790 A1* 11/2002 Yamashita et al. ............ 362/31

\* cited by examiner

*Primary Examiner*—John Anthony Ward
*Assistant Examiner*—Guiyoung Lee
(74) *Attorney, Agent, or Firm*—Osha Liang LLP

(57) ABSTRACT

A point-light-source type light emitting portion faces a light incident face located at a corner portion of a light guide plate. A light diffusion pattern for emitting the light in the light guide plate from a light emission face is on the lower surface of the light guide plate. A diffusion prism sheet is on the light emission face. A prism sheet including prisms each having a concentric shape with the light emitting portion at the center is on the lower surface of the diffusion prism sheet, and an uneven diffusion plate is on the upper surface of the diffusion prism sheet. Light emitted from the light emission face of the light guide plate along the light emission face is deflected in the direction perpendicular to the light guide plate by the prism sheet, and the angle of beam spread of the light is spread by the uneven diffusion plate.

4 Claims, 30 Drawing Sheets

PRIOR ART

PRIOR ART

PRIOR ART

PRIOR ART

FIG. 26A
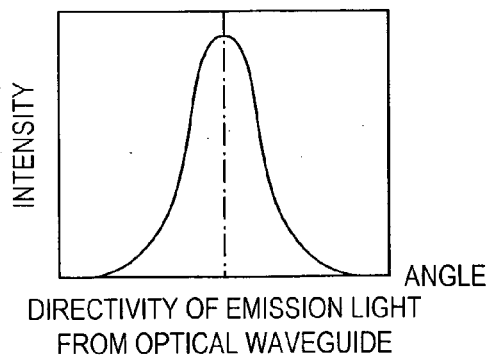
DIRECTIVITY OF EMISSION LIGHT FROM OPTICAL WAVEGUIDE

FIG. 26B
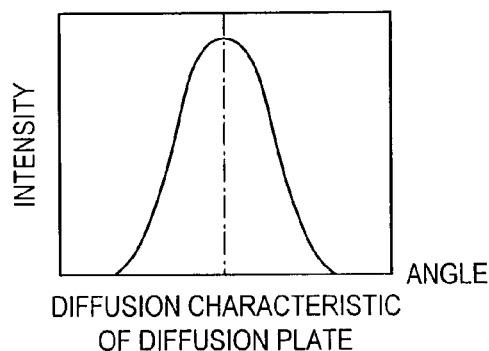
DIFFUSION CHARACTERISTIC OF DIFFUSION PLATE

FIG. 26B'
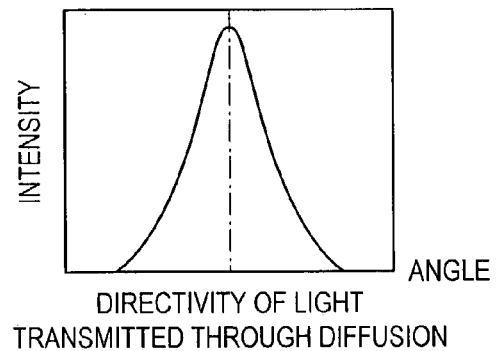
DIRECTIVITY OF LIGHT TRANSMITTED THROUGH DIFFUSION

FIG. 26C
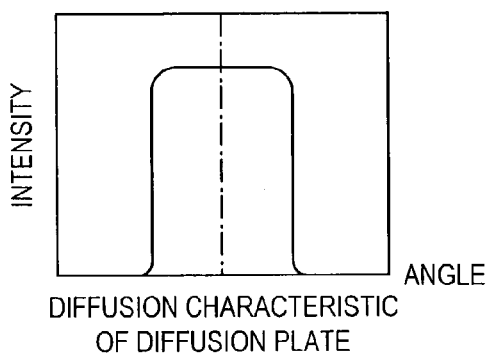
DIFFUSION CHARACTERISTIC OF DIFFUSION PLATE

FIG. 26C'
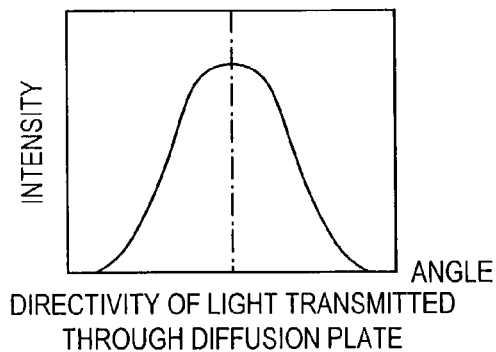
DIRECTIVITY OF LIGHT TRANSMITTED THROUGH DIFFUSION PLATE

FIG. 26D
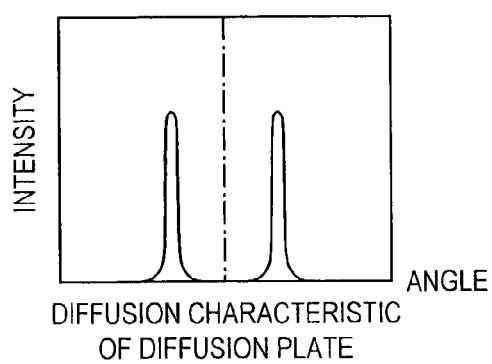
DIFFUSION CHARACTERISTIC OF DIFFUSION PLATE

FIG. 26D'
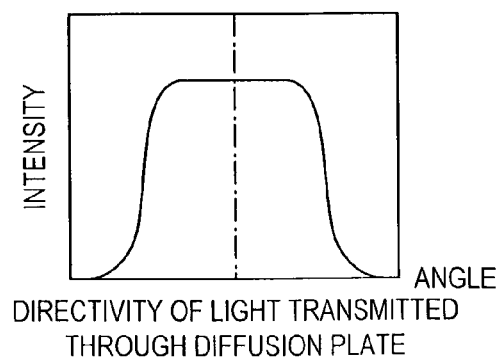
DIRECTIVITY OF LIGHT TRANSMITTED THROUGH DIFFUSION PLATE

CHARACTERISTIC OF
DIFFUSION PLATE

CHARACTERISTIC OF
EMISSION LIGHT FROM
OPTICAL WAVEGUIDE

CHARACTERISTIC OF
EMISSION LIGHT FROM
OPTICAL WAVEGUIDE

CHARACTERISTIC OF LIGHT
TRANSMITTED THROUGH OPTICAL
WAVEGUIDE AND DIFFUSION PLATE

CHARACTERISTIC OF LIGHT
TRANSMITTED THROUGH OPTICAL
WAVEGUIDE AND DIFFUSION PLATE

SURFACE LIGHT SOURCE DEVICE, DIFFUSION PLATE AND LIQUID CRYSTAL DISPLAY DEVICE

BACKGROUND OF THE INVENTION

1. Field of the Invention

The present invention relates to a surface light source device, a diffusion plate and a liquid crystal display device, and particularly to a surface light source device used as a back light for a liquid crystal display panel or the like, a diffusion plate for the surface light source device and a liquid crystal display device using the surface light source device.

2. Description of the Related Art

A surface light source device is used as a back light or the like for a transmission type liquid crystal display panel. The liquid crystal panel generates an image by transmitting or intercepting light every pixel. The liquid crystal display panel has no function of spontaneously emitting light, and thus it needs a surface light source device for back light.

FIG. 1 is an exploded perspective view showing the structure of a conventional surface light source device 1, and FIG. 2 is a cross-sectional view of FIG. 1.

The surface light source device 1 comprises a light guide plate 2 for confining light therein, a light emitting portion 3 and a reflection plate 4. The optical guide plate 2 is formed of transparent resin having a high refractive index such as polycarbonate resin, methacrylic resin or the like, and a diffusion pattern 5 is formed on the back surface of the optical guide plate 2 by using irregularities processing, dot printing of diffusing/reflecting ink or the like. The light emitting portion 3 includes plural light emission diodes (LED) 7 mounted on the front surface of a circuit board 6, and the light emission diodes 7 are arranged so as to face a side surface (light incident side surface 8) of the light guide plate 2. The reflection plate 4 is formed of a white resin sheet having high reflectivity, for example, and it is attached to the lower surface of the light guide plate 2 by double-sided tape.

In the surface light source device 1, as shown in FIG. 2, light p emitted from the light emitting portion 3 and guided from the light incident side surface 8 into the light guide plate 2 is repetitively totally reflected between the obverse and back surfaces of the light guide plate 2 and propagates in such a direction as to be far away from the light emitting portion 3 while being confined in the light guide plate 2. The light p propagating through the light guide plate 2 as described above is incident to the back surface of the light guide plate 2, and diffused/reflected by a diffusion pattern 5. At this time, a part of the light p that is reflected from the diffusion pattern 5 formed on the lower surface of the light guide plate 10 to the surface (light emission face 10) of the light guide plate 2 at an angle smaller than the critical angle of the total reflection is emitted from the light emission face 10 to the outside of the light guide plate 2. On the other hand, a part of the light p that passes through a portion of the lower surface of the light guide plate 2 on which no diffusion pattern 5 is formed and emits from the back surface of the light guide plate 2 is reflected from the reflection plate 4, returned into the inside of the light guide plate 2 and confined in the light guide plate 2 again. Accordingly, the loss of light amount from the back surface of the light guide plate 2 can be prevented by the reflection plate 4.

The light emitted from the light emission face 10 of the light guide plate 2 as described above is emitted to from a medium having a large refractivity to a medium having a small refractivity, and thus the light is emitted with being close to the light emission face 10, as shown in FIG. 3. Assuming that the x-axis is set along the width direction of the light incident side surface 8, the y-axis is set along the direction perpendicular to the light incident side surface 8 and the z-axis is set along the direction perpendicular to the light emission face 10, the light emitted from the light emission face 10 has a slender directivity profile extending substantially in the y-axis. Under this state, the light emission face 10 of the surface light source device 1 looks dark when viewed from the direction (z-axis direction) perpendicular to the light emission face 10. Therefore, it is general that the peak direction of the directivity profile of light is oriented to the z-axis direction perpendicular to the light emission face 10 by disposing a diffusion plate 11 having relatively large diffusion degree on the light emission face 10 and diffusing light emitted from the light emission face 10 with the diffusion plate 11 as shown in FIG. 3.

Besides, a prism sheet 13 is used as shown in FIG. 4 when stronger directivity is needed as compared with the case of FIG. 3. That is, the prism sheet 13 is disposed above the light emission face 10 of the light guide plate 2, and diffusion plates 12, 14 are disposed at the back and obverse sides of the prism sheet 13, respectively. In this case, light emitted from the light emission face 10 is diffused by the diffusion plate 12 so that the direction of light directivity is approached to the vertical direction, and then oriented to the vertical direction by the prism sheet 13. Thereafter, the light is further diffused by the diffusion plate 14 so as to emit in the direction perpendicular to the light emission face 10. Here, the action of the diffusion plate 12 is to make light incident to the prism sheet 13 at such an angle that light passing through the prism sheet 13 directs in the z-axis direction. As shown in FIG. 4, there exists an emission angle α at which light is hardly emitted from the prism sheet 13 in an oblique direction to the vertical direction (i.e., the light intensity of light passing through the prism sheet 13 is minimum at the angle α). When viewed from the direction of the angle α, images on the liquid crystal display panel are hardly viewed. Therefore, the light is diffused by the diffusion plate 14 so that a part of diffused light is distributed in the direction of the angle a and thus an image can be viewed over a broad range with the z-axis direction at the center of the range. Furthermore, the diffusion plates 12, 14 and the prism sheet 13 also have a function of shielding the diffusion pattern 5 formed on the lower surface of the light guide plate 2 so that the diffusion pattern 5 is hidden from view from the front side.

The power consumption is more greatly reduced in the case of the surface light source device using LED as described above than in the case of the surface light source device using a cold cathode ray tube. However, the surface light source device using LED is used for commercial products having high portability like portable information terminals such as cellular phones, PDA (Personal Digital Assistance), etc. from the viewpoint of performance of compactness in size and lightness in weight, and increase of the lifetime of power sources is strongly required for these products to enhance convenience when they are carried, and also reduction of the power consumption is required. Accordingly, reduction in power consumption is also strongly required for the surface light device (back light) used in these commercial products. Therefore, LED having higher efficiency is used in the surface light source device, and as light emission efficiency of light emitting elements is enhanced, the number of light emitting elements to be used is reduced.

However, in the case of the surface light source device 1 equipped with the light emitting portion 3 having plural LEDs 7 which are arranged in a line to be designed as a linear light source as shown in FIG. 1, if the number of LEDs 7 is reduced, the light emission face (light emission face) becomes dark or luminance unevenness (unevenness in brightness) is intensified. Therefore, there is a limit to the reduction of the number of LEDs 7, and thus there is also a limit to the reduction in power consumption.

FIG. 5 shows a surface light source device 21 having a light emitting portion 23 in which several (preferably, one) light emitting elements such as LEDs or the like are collected in one place to thereby achieve a point light source.

In the surface light source device 21, the light emitting portion 23 designed in the form of a point light source is disposed so as to face a side surface (light incident face 22a) of a light guide plate 22 formed of transparent resin having a high refractive index such as polycarbonate resin, methacrylic resin or the like. On the lower surface of the light guide plate 22, a number of diffusion patterns 24 are arranged on arcs which are arranged concentrically with the light emitting portion 23 at the center. Each diffusion pattern 24 is formed in the recess shape on the lower surface of the light guide plate 22 to have an arcuate section, and it extends along the peripheral direction of the arcs arranged concentrically with the light emitting portion 23 at the center. The reflection face of each diffusion pattern 24 is perpendicular to the direction connecting the light emitting portion 23 and the diffusion pattern 24 concerned (this direction is assumed as "r-axis direction") in plan view. The diffusion pattern 24 is formed so that the pattern density is gradually increased as the diffusion pattern 24 is remoter from the light emitting portion 23.

In the surface light source device 21, when the light emitting portion 23 is actuated to emit light, light emitted from the light emitting portion 23 is incident from the light incident face 22a into the light guide plate 22 and repetitively totally-reflected between the upper and lower surfaces of the light guide plate 22 while propagating from the light emitting portion 23 to a remoter side. Light diffused and reflected on the lower surface of the light guide plate 22 by the diffusion patterns 24 while propagating in the light guide plate 22 would be emitted from the upper surface of the light guide plate 22 (light emission face) if it is incident to the upper surface of the light guide plate 22 at an incident angle smaller than the critical angle of total reflection. However, in such a surface light source device 21 as described above, the light diffused and reflected by the diffusion patterns 24 is diffused on the zr plane, however, it is not diffused on the xy plane. When viewed from the z-axis direction, the light goes straight even after it is reflected by the diffusion patterns 24. Therefore, the amount of light emitted in any direction around the light emitting portion 23 is not varied even when the light is diffused by the diffusion patterns 24, and the amount of light transmitted in each direction in the light guide plate 22 is determined by the amount of light emitted in each direction from the light emitting portion 23.

According to the surface light source device 21 as described above, light can be uniformly emitted from the overall light emission face (i.e., the overall, light emission face can uniformly shine) by making light incident from the light emitting portion 23 in each direction in the light guide plate 22 so that the amount of the light corresponds to the distance at which the light passes through the light guide plate 22. By combining a transmission-type liquid crystal display panel with the surface light source device 21 as described above, a liquid crystal display device in which images are easily viewable at a wide angle can be manufactured, and also it can contribute to the reduction of the power consumption of the liquid crystal display device.

When there is a probability that plural persons view a screen at the same time like a note-type personal computer or the like, it is required to make the screen viewable at a wide angle, and thus a surface light source device for emitting light having broad directivity is needed. However, in the case of mobile equipment which is represented by a cellular phone, it is based on the assumption of personal use. Accordingly, it is preferable that the directivity is narrowed to make the screen invisible to neighbors in a train or the like. There is particularly required such a surface light source device that no light is emitted in oblique directions.

Furthermore, it is better that no light is emitted in the oblique directions because there is no extra emission light and thus the power consumption can be more greatly reduced. Or, the light emitted from the light emitting portion can be collected to the front side to enhance the brightness at the front side. At any rate, the efficiency (=brightness/power consumption) of the surface light source device can be enhanced.

However, when a diffusion plate is used as in the case of the surface light source device as the first prior art, light is emitted in all the directions, and thus it is difficult to narrow the emission range of light emitted from the liquid crystal display device.

Furthermore, in the case of the surface light source device 21 as the second prior art, the travel direction of light emitted from the light emitting portion 23 is directly changed to the direction perpendicular to the light guide plate 22 while the light is spread to the overall area in the light guide plate 22, thereby emitting the light from the light emission face. Therefore, this prior art has no device for narrowing the angle of beam spread (hereinafter referred to as "directivity angle") of light.

In the case of the surface light source device 21 as the second prior art, radial luminance unevenness (emission lines) R around the light emitting portion 23 as shown in 6 is partially viewed when viewed from the oblique upper side. Therefore, when the surface light source device 21 is used in a liquid crystal display device or the like, the luminance unevenness R obstructs the view of images from some viewing directions, so that the quality of the image display device or the like is lowered.

SUMMARY OF THE INVENTION

The present invention has been implemented in view of the foregoing problems of the prior arts, and has an object to reduce radial luminance unevenness occurring in a surface light source device.

Another object of the present invention is to reduce the difference between the angle of beam spread (directivity angle) in a broad-directivity direction and the angle of beam spread (directivity angle) in a narrow-directivity direction by spreading light in the narrow-directivity direction in a surface light source device using a light source, in particular, a point light source while the directivity of light emitted substantially vertically from the surface light source device is kept to be narrow.

Other object of the present invention is to provide a diffusion plate used in the surface light source device concerned and a liquid crystal display device using the surface light source device concerned.

According to a first aspect of the present invention, there is provided a surface light source device including a point light source from the light emission face, a light guide plate for spreading light incident from the point light source in a plane shape and then emitting the light from a light emission face thereof and a prism sheet disposed so as to face the light emission face of the light guide plate, characterized in that the light guide plate has means for deflecting light in the light guide plate only on a plane which is vertical to the light emission face and contains the point light source and emitting the light substantially along the light emission face and in a direction opposite to the point light source from the light emission face, and the prism sheet has a function of deflecting the light emitted from the light emission face in a direction perpendicular to the light emission face. Here, the point light source means a light source which is smaller in size than the light guide plate, and it is not necessarily a small light source literally.

According to the surface light source device of the first aspect of the present invention, the light emitted from the point light source is guided into the light guide plate, and the light in the light guide plate is deflected only on the plane which is vertical to the light emission face and contains the point light source and emitted from the light emission face substantially along the light emission face. Therefore, light having directivity which is narrow and long in one direction is emitted from the light emission face of the light guide plate. The prism sheet having the function of deflecting the light emitted from the light emission face of the light guide plate in the direction perpendicular to the light emission face is disposed so as to face the light emission face of the light guide plate as described above, whereby the light emitted from the light guide plate and transmitted through the prism sheet can be emitted in a direction which is substantially vertical to the light guide plate and the prism sheet. In addition, in the surface light source device using the point light source as described above, if light is emitted vertically by using the prism sheet disposed so as to face the light emission face of the light guide plate, the difference between the directivity angle in a large light-directivity direction and the directivity angle in a small light-directivity direction can be more greatly reduced as compared with the case where light is emitted vertically from the light guide plate by using light diffusing patterns of a light guide plate, and thus deviation of the directivity in each direction can be reduced without excessively spreading the directivity. Accordingly, when the surface light source device is used in combination of a liquid crystal display panel or the like, the visibility of the screen from any direction at the front side is excellent, however, the visibility of the screen from the lateral side is poor. Therefore, a liquid crystal display device which is optimal to a cellular phone or the like can be provided. Furthermore, luminance unevenness (irregularity) which occurs on a part of the screen can be reduced.

According to an embodiment of the surface light source device of the first aspect of the present invention, the means for deflecting the light in the light guide plate is constructed by an uneven pattern having a light deflecting face, and the inclination angle of the light deflecting face on the plane which passes through the point light source and is vertical to the light emission face is set to be substantially fixed in the light guide plate. Therefore, the spread of light on the plane which passes through the point light source and is vertical to the light emission face can be reduced, and the directivity can be prevented from further spreading in the large directivity-angle direction of light.

According to a second aspect of the present invention, there is provided a surface light source device including a light source, a light guide plate for spreading light incident from the light source in a plane shape and then emitting the light from a light emission face thereof and a prism sheet disposed so as to face the light emission face of the light guide plate, characterized in that the light guide plate has means for emitting light from the light emission face substantially along the light emission face and in a direction opposite to the light source, and the prism sheet has a region in which the light emitted from the light emission face is deflected to a direction vertical to the light emission face, the area of the region occupying 50% or more of the prism sheet when viewing the prism sheet from the direction perpendicular to the prism sheet.

In the surface light source of the second aspect of the present invention, the light emitted from the light source is guided into the light guide plate, and emitted from the light emission face substantially along the light emission face. Therefore, light having directivity which is narrow and long in one direction is emitted from the light emission face of the light guide plate. The prism sheet having the function of deflecting the light emitted from the light emission face of the light guide plate in the direction vertical to the light emission face is disposed so as to face the light emission face of the light guide plate as described above, whereby the light emitted from the light guide plate and transmitted through the prism sheet can be emitted in the direction which is substantially vertical to the light guide plate and the prism sheet.

In addition, in the surface light source device using the light source as described above, the prism sheet has a region in which the light emitted from the light emission face is deflected to the direction perpendicular to the light emission face, and the area of the region occupies 50% or more of the total area of the prism sheet when it is observed from the direction perpendicular to the prism sheet, so that the brightness (luminance) of the light emission face of the surface light source device can be enhanced, and this surface light source device has a preferable characteristic as the surface light source device.

According to an embodiment of the surface light source device of the second aspect of the present invention, plural prisms each of which has an incident face and a reflection face crooked in a projecting shape are arranged on a surface of the prism sheet which faces the light guide plate. After light emitted from the light guide plate is incident from the incident face into the prism, the light is reflected from the substantially whole area of each convex-shaped reflection face and deflected to the direction perpendicular to the prism sheet, so that the radial luminance unevenness and the reduction of the efficiency in the vertical direction in the surface light source device can be suppressed.

According to another embodiment of the surface light source device according to the second aspect of the present invention, plural prisms each of which has an incident face and a curved reflection face (for example, the reflection face is curved in a convex shape) are arranged on a surface of the prism sheet which faces the light guide plate. Light emitted from the light guide plate is incident from the incident face into the prism, reflected from the substantially whole area of each curved reflection face and deflected in the direction perpendicular to the prism sheet, so that the radial luminance unevenness and the reduction of the efficiency in the vertical direction in the surface light source device can be suppressed.

According to a third aspect of the present invention, there is provided a surface light source device including a light source, a light guide plate for spreading light introduced from the light source in a plane shape and emitting the light thus spread from a light emission face thereof, and a prism sheet disposed so as to face the light emission face of the light guide plate, characterized in that plural prisms each of which has an incident face and an reflection face are arranged on a surface of the prism sheet which faces the light guide plate, after light emitted from the light guide plate is incident from the light incident face into the prism, the light is reflected from the reflection face and a part of the light is deflected in the direction perpendicular to the prism sheet while another part of the light is incident to the incident face again and reflected from the incident face, whereby the light is deflected in the direction perpendicular to the prism sheet.

According to the surface light source device of the third aspect of the present invention, the plural prisms each having the incident-face and the reflection face are arranged on the surface of the prism sheet which faces the light guide plate, and after the light emitted from the light guide plate is incident from the incident face into the prism, the light is reflected from the reflection face. A part of the light is deflected in the direction perpendicular to the prism sheet, and another part of the light is incident to the incident face again and reflected from the incident face, whereby the light is deflected in the direction perpendicular to the prism sheet. Therefore, the radial luminance unevenness and the reduction of the efficiency in the vertical direction in the surface light source device can be suppressed.

According to a fourth aspect of the present invention, there is provided a surface light source device including a light source, a light guide plate for spreading light introduced from the light source in a plane shape and emitting the light thus spread from a light emission face thereof, and a diffusion plate disposed so as to face the light emission face of the light guide plate, characterized in that the directivity of light transmitted through the diffusion plate with respect to vertical incidence has at least one local maximum value within the angular range of 20 degrees at each of both the sides of the direction vertical to the diffusion plate.

According to the surface light source device of the fourth aspect of the present invention, the directivity of the light which is emitted from the light guide plate and then transmitted through the diffusion plate is close to a rectangular shape, and thus the difference between the directivity angle in a broad-directivity direction of the light emitted from the light guide plate and the directivity angle in a narrow-directivity direction of the light emitted from the light guide plate becomes small. Therefore, radial luminance unevenness occurs hardly. Further, since the directivity of the light transmitted through the diffusion plate is close to a rectangular shape, the amount of light emitted to the front side is increased and the brightness at the front side is enhanced. In addition, the deviation in directivity is reduced. Therefore, same illumination can be achieved in any direction at the front side. Such a diffusion plate can be formed by arranging plural substantially-conical irregularities (uneven portions).

The diffusion plate of the present invention is characterized in that the full width at half maximum in the directivity of the transmission light to the vertical incidence is varied depending on the direction, and a direction in which the full width at half maximum at each point is large is oriented to a concentric direction with respect to predetermined one point.

According to the diffusion plate of the present invention, the direction in which the full width at half maximum at each point is large is oriented to the concentric direction with respect to predetermined one point. Therefore, when a direction in which the full width at half maximum of light emitted from the light guide plate is narrow is oriented to the concentric direction with respect to predetermined one point (for example, the position of the light source), the difference in directivity (full width at half maximum) of the light emitted from the light guide plate and transmitted through the diffusion plate with respect to the direction is reduced by combining the light guide plate with the diffusion plate. As a result, in the radial luminance unevenness is reduced in the surface light source device using the diffusion plate as described above. Furthermore, in a liquid crystal display device using a liquid crystal panel and the above surface light source device in combination, images on the screen can be made easily viewable from any direction at the front side.

Another diffusion plate according to the present invention is characterized by including plural uneven portions which are long in one direction, the direction of the short side of each uneven portion is oriented to a concentric direction with respect to predetermined one point.

The other diffusion plate of the present invention is equipped with the plural uneven portions which are long in one direction, and the short-side direction of each uneven portion is oriented to the concentric direction with respect to the predetermined one point. Therefore, when the direction in which the full width at half maximum of light emitted from the light emission face of the light guide plate is oriented to the concentric direction with respect to predetermined one point (for example, the position of the light source), the difference in directivity (full width at half maximum) of the light emitted from the light guide plate and transmitted through the diffusion plate with respect to the direction is reduced by combining the light guide plate with the diffusion plate. As a result, in the radial luminance unevenness is reduced in the surface light source device using the diffusion plate as described above. Furthermore, in a liquid crystal display device using a liquid crystal panel and the above surface light source device in combination, images on the screen can be made easily viewable from any direction at the front side.

A liquid crystal display device in which luminance unevenness hardly occurs, the angle of vision is relatively narrow and images can be easily viewed in any direction can be manufactured by combining the surface light source device according to the present invention with a liquid crystal display panel.

The above-described constituent elements of the present invention may be combined with one another as freely as possible.

BRIEF DESCRIPTION OF THE DRAWINGS

FIG. 26A is a diagram showing the directivity of light emitted from the light guide plate, FIGS. 26B to 26D are diagrams showing the diffusion characteristic of the diffusion plate, and FIGS. 26B' to 26D' are diagrams showing the directivity of light which is emitted from the light guide plate and transmitted through the diffusion plates having the characteristics of 26B to 26D, respectively;

DETAILED DESCRIPTION OF THE PREFERRED EMBODIMENTS

Preferred embodiments according to the present invention will be described hereunder with reference to the accompanying drawings.

(First Embodiment)

Figure 7:
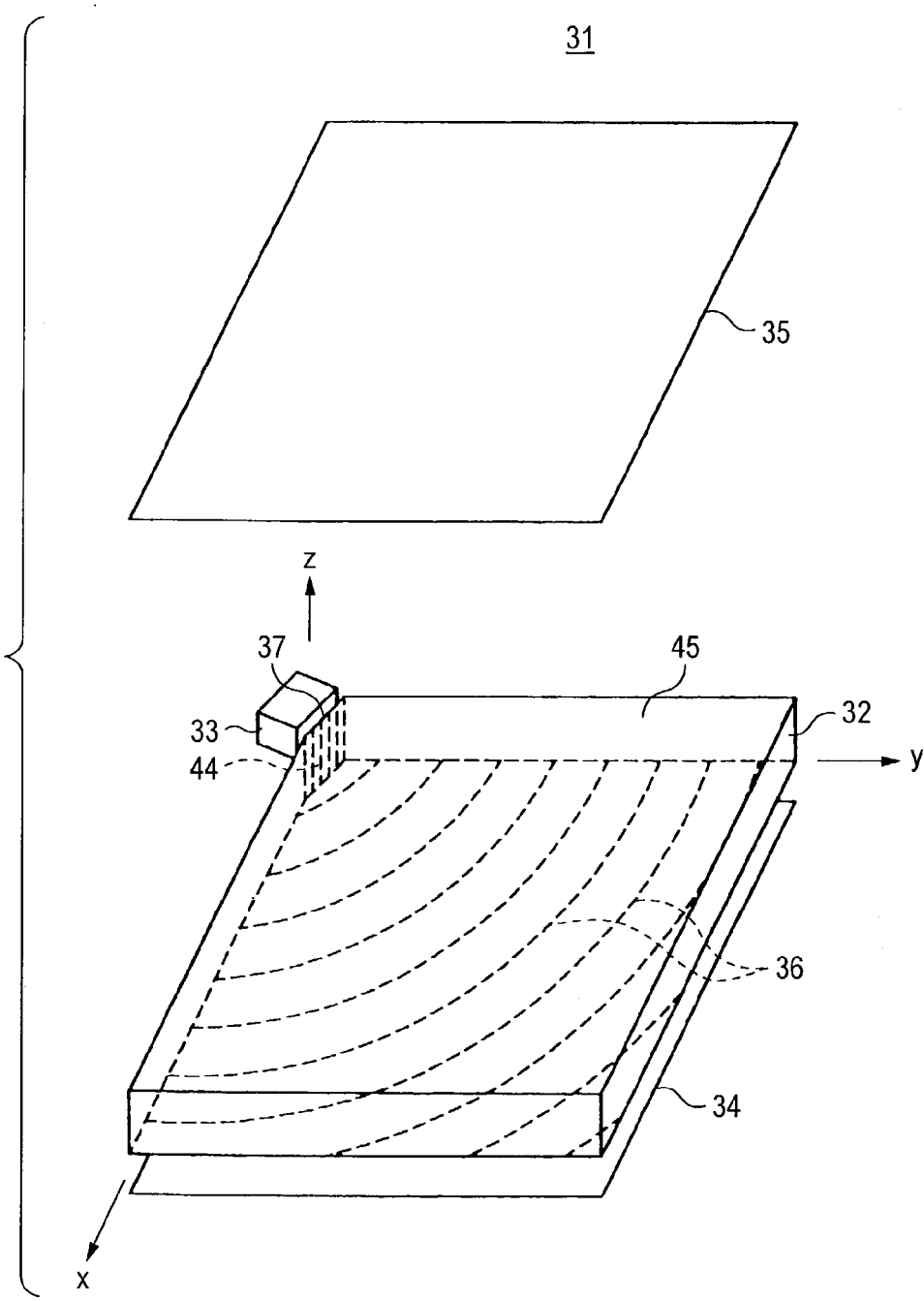
FIG. 7 is an exploded perspective view showing the structure of a surface light source device according to a first embodiment of the present invention.
Figure 8:
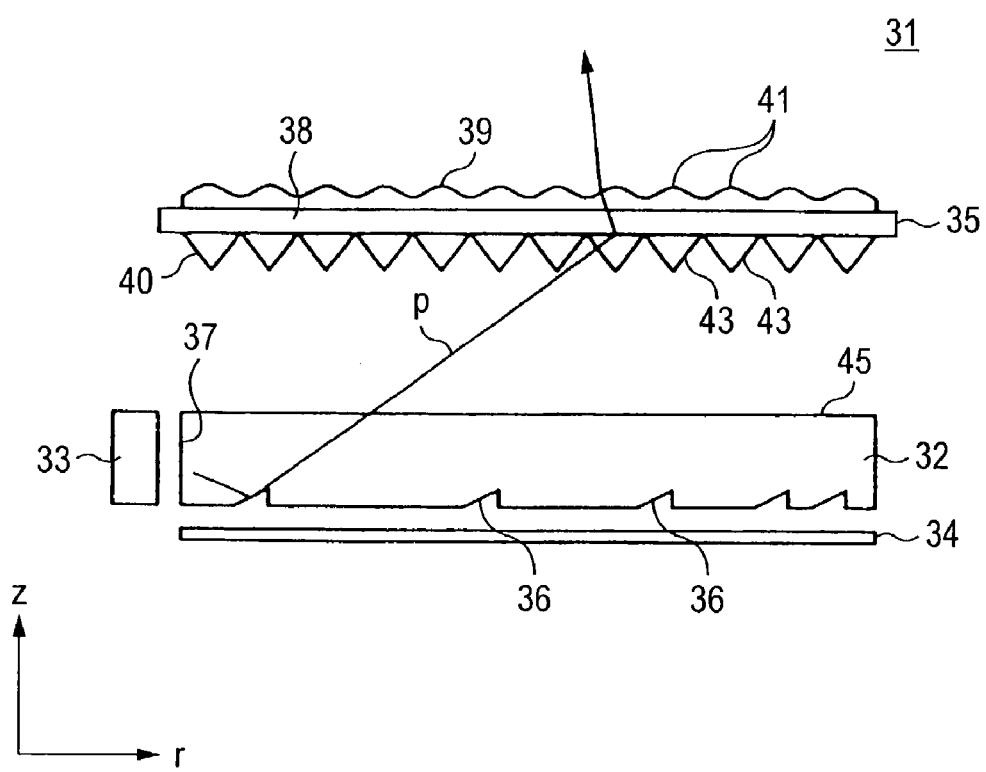
FIG. 8 is a schematic cross-sectional view schematically showing the surface light source device shown in FIG. 7.

FIG. 7 is an exploded perspective view showing the structure of a surface light source device 31 according to a first embodiment of the present invention, and FIG. 8 is a cross-sectional view schematically showing the surface light source device 31 of FIG. 7.

The surface light source device 31 shown in FIG. 7 mainly comprises a light guide plate 32, a light emitting portion 33, a reflection plate 34 and a diffusion prism sheet 35. The light guide plate 32 is formed of transparent resin such as polycarbonate resin, methacrylic resin or the like to have a rectangular flat shape, and is equipped with light diffusion patterns 36 on the back surface thereof. Furthermore, a light incident face 37 is formed at a place of a corner portion of the light guide plate by cutting out the corner portion obliquely in plan view.

The light emitting portion 33 (not shown) is formed by sealing one or plural LEDs in transparent mold resin and covering the surfaces other than the front face of the mold resin with white resin. Light emitted from LED is directly reflected at the interface between the mold resin and the white resin, and then emitted from the front face (light emission face) of the light emitting portion 33. The light-emitting portion 33 is disposed so as to face the light incident face 37 of the light guide plate 32.

Figure 9:
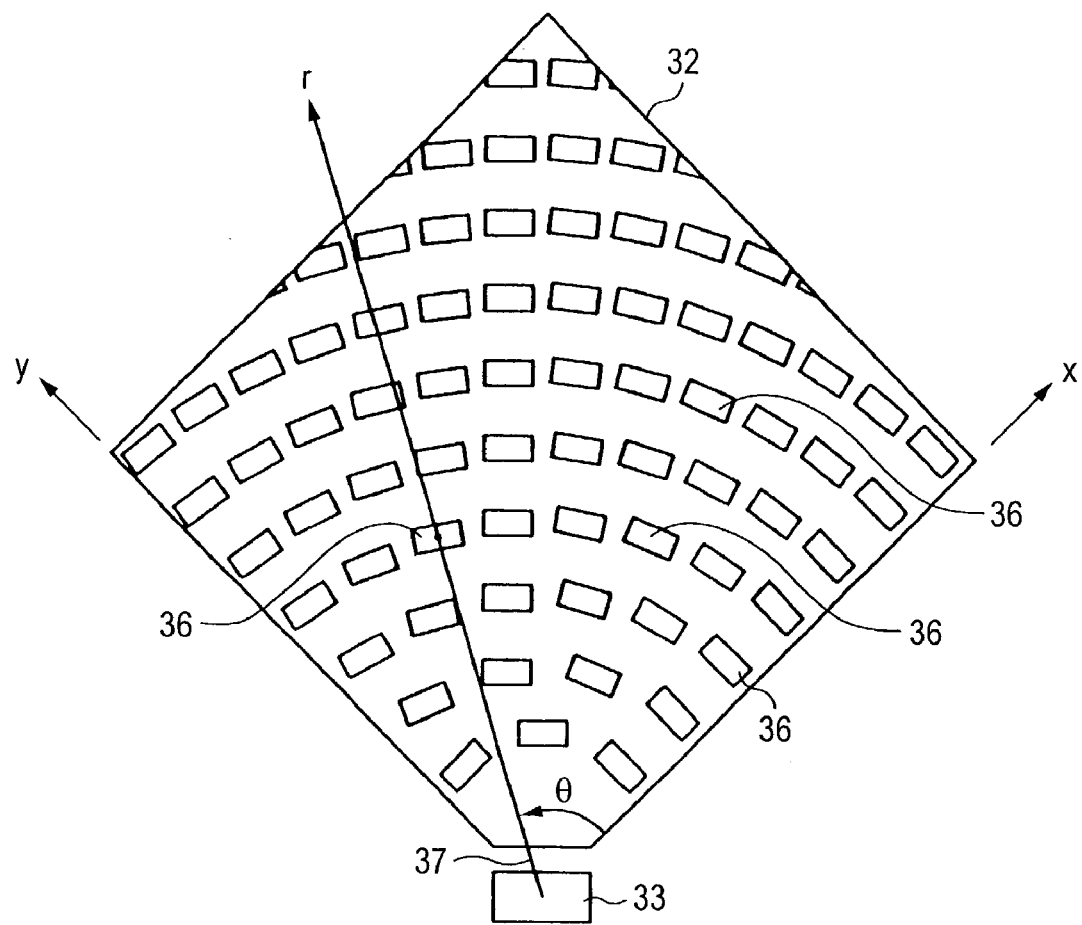
FIG. 9 is a diagram showing an arrangement of light diffusion patterns formed on a light guide plate of the surface light source device.

FIG. 9 shows an arrangement of the light diffusion patterns 36 formed on the light guide plate 32.

In the embodiment of the present invention, it is assumed that the z-axis is set along the direction vertical to the surface of the light guide plate 32, and the x-axis and the y-axis are set along the directions parallel to the two sides adjacent to the light incident face 37, respectively. Furthermore, when light propagating in any direction is considered or reflection at any light diffusion pattern 36 is considered, it is assumed that the r-axis is set along the direction parallel to the surface of the light guide plate 32 on a plane which contains propagating light ray and is perpendicular to the light guide plate 32, or the r-axis is set along the direction parallel to the surface of the light guide plate 32 on a plane which contains the direction connecting the light emitting portion 33 and each light diffusion pattern and is perpendicular to the light guide plate 32. Further, the intersection angle between the x-axis and the r-axis is represented by θ.

The light diffusion patterns 36 formed on the lower surface of the light guide plate 32 are arranged so as to be located on arcs which are concentric with one another around the light emitting portion 33 (particularly, the LED located in the light emitting portion 33). Each light diffusion pattern 36 is formed linearly on the back surface of the light guide plate 22 by recessing the back surface of the light guide plate 22 so as to as to have an asymmetrical triangular shape in section. The oblique angle of the slope surface nearer to the light emitting portion 33 in each light diffusion pattern 36 having the triangular shape in section is preferably within 20°.

Furthermore, the respective light diffusion patterns 36 are linearly spread along the circumferential direction of the arcs around the light emitting portion 33, and the reflection face of each light diffusion pattern 36 is orthogonal to the direction (r-axis direction) connecting the light emitting portion 33 and the light diffusion pattern 36 in plan view (viewed from the z-axis direction). The light diffusion patterns 36 are formed so that the pattern density is gradually increased as they are remoter from the light emitting portion 33. However, the pattern density of the diffusion patterns 24 in the neighborhood of the light emitting portion 23 may be set to be substantially uniform. Furthermore, an optical element 44 comprising a lens, a prism or the like may be formed on the light incident face 37 of the light guide plate 22 in order to control the orientation pattern of light incident from the light emitting portion 33 into the light guide plate 32.

The surface of the reflection plate 34 is subjected to mirror-surface processing using Ag plating, and it is disposed so as to face the overall back surface of the light guide plate 22.

The diffusion prism sheet 35 is achieved by forming a transparent uneven diffusion plate 39 on the surface of a transparent plastic sheet 38 and forming a transparent prism sheet 40 on the back surface of the plastic sheet 38. The uneven diffusion plate 39 and the prism sheet 40 are formed by dropping ultraviolet-ray curable resin on the upper surface of the plastic sheet 38, pressing the ultraviolet-ray curable resin with a stamper to spread the ultraviolet-ray curable resin between the stamper and the plastic sheet 38, and then irradiating ultraviolet ray to the ultraviolet-ray curable resin to cure the ultraviolet-ray curable resin (Photo Polymerization method).

Figure 10A:
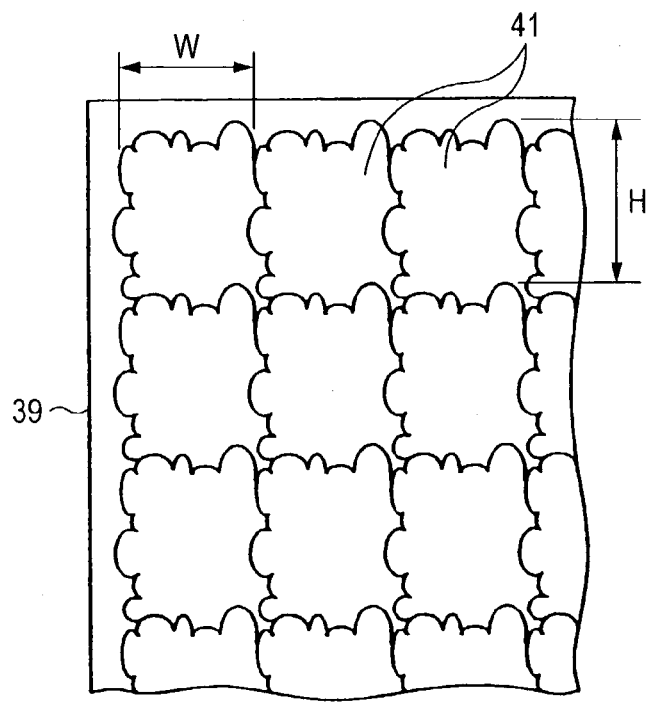
FIG. 10A is a partially-broken plan view showing an uneven diffusion plate of a diffusion prism sheet used for the surface light source device of FIG. 7.
Figure 10B:
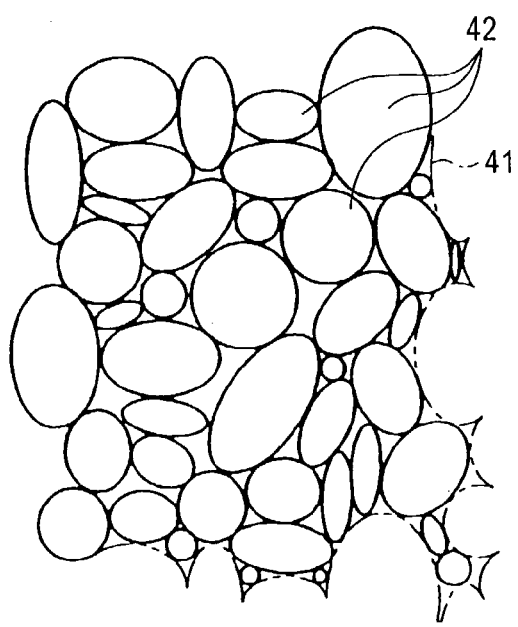
FIG. 10B is a plan view showing a repetitive pattern constituting the uneven diffusion plate.
Figure 10C:
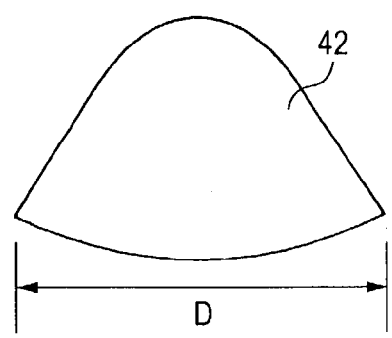
FIG. 10C is an enlarged perspective view showing a projecting portion constituting the repetitive pattern.

FIGS. 10A, 10B and 10C are diagrams showing the structure of the uneven diffusion plate 39.

In the uneven diffusion plate 39, the repetitive patterns 41 are periodically arranged with little gap in the right-and-left direction and in the up-and-down direction as shown in FIG. 10A. As shown in FIG. 10B, the repetitive pattern 41 includes projecting portions 42 which are randomly arranged with little gap, and each projecting portion 42 has a conical shape whose apex is rounded as shown in FIG. 10C.

The width H, W in the longitudinal direction and the lateral direction of one repetitive pattern 41 are set to be larger than the size of the pixel of the liquid crystal display panel to prevent Moire fringes, and they are preferably set to not less than 100 μm and not more than 1 mm. The dimensions of the projecting portions 42 constituting the repetitive pattern 41 may be uneven, and it is preferable that the outer diameter D of each projecting portion is set to not less than 5 μm and not more than 30 μm (particularly, it is most preferable that the outer diameter D is equal to about 10 μm).

Since the uneven diffusion plate 39 has special diffusion characteristics, the unevenness (irregularity) shape of the patterns must be accurately controlled. In this case, if one unevenness pattern is periodically arranged, all the unevenness patterns have the same shape, so that they can be manufactured in the same manner so as to have the accurate unevenness shape. However, in the case of this method, Moire fringes easily occur on the screen of the liquid crystal display device or pixels are extremely conspicuous. Conversely, if the unevenness patterns are randomly arranged, the shape and size of the unevenness patterns must be varied every unevenness pattern. Therefore, it is difficult to achieve the accurate shape. Furthermore, the characteristics of the uneven diffusion plate may be varied from place to place. Therefore, according to the uneven diffusion plate 39 of the present invention, the projecting portions 42 which are random in shape and dimension are randomly arranged to constitute the repetitive pattern 41, and the repetitive pattern 41 thus achieved is periodically arranged, thereby facilitating the manufacturing of the patterns of the uneven diffusion plate 39 while suppressing occurrence of Moire fringes, etc.

Figure 11:
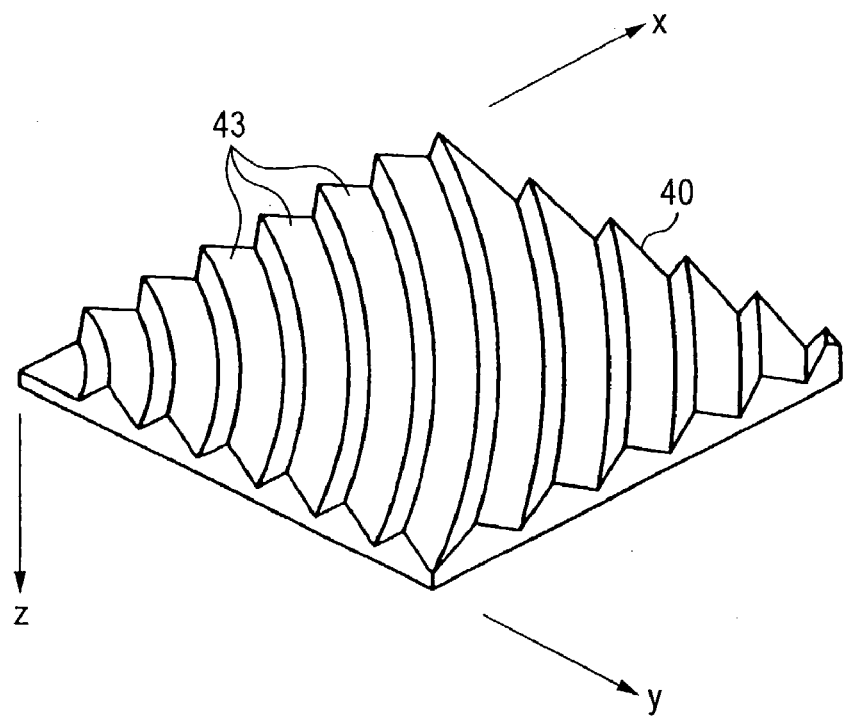
FIG. 11 is a perspective view showing of the prism sheet of the diffusion prism sheet used in the surface light source device of FIG. 7 when viewed from the back side.

FIG. 11 is a perspective view showing the structure of the prism sheet 40 when viewed from the back side.

In the prism sheet 40, arcuate prisms 43 having asymmetrical triangular shape in section (in FIG. 11, the arcuate prisms 43 are illustrated as being large in an exaggerated form) are concentrically arranged, and each arcuate prism 43 is formed so as to be arcuate in shape around the position at which LED of the light emitting portion 33 is located.

The uneven diffusion plate 39 and the prism sheet 40 are not necessarily required to be formed as one body as in the case of the above embodiment, and they may be formed separately from each other with some gap therebetween. However, it is better to form them integrally with the plastic sheet 38 as in the above embodiment because the thickness is reduced as a whole and the cost is lowered.

Figure 12:
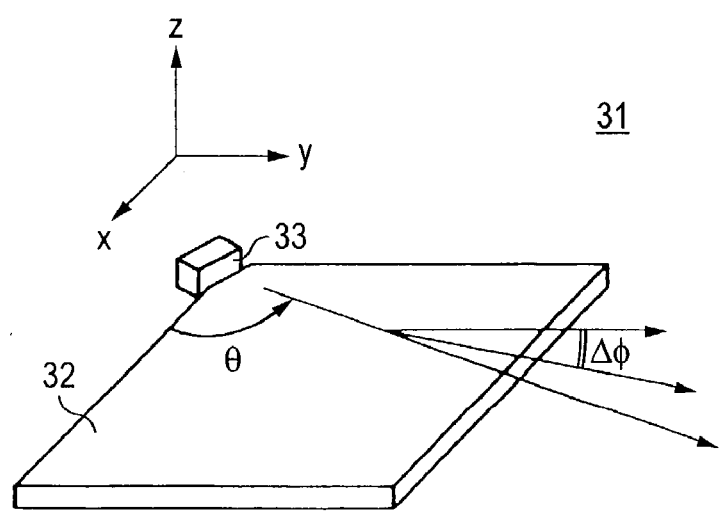
FIG. 12 is a perspective view schematically showing the behavior of light in the surface light source device of FIG. 7.
Figure 13A:
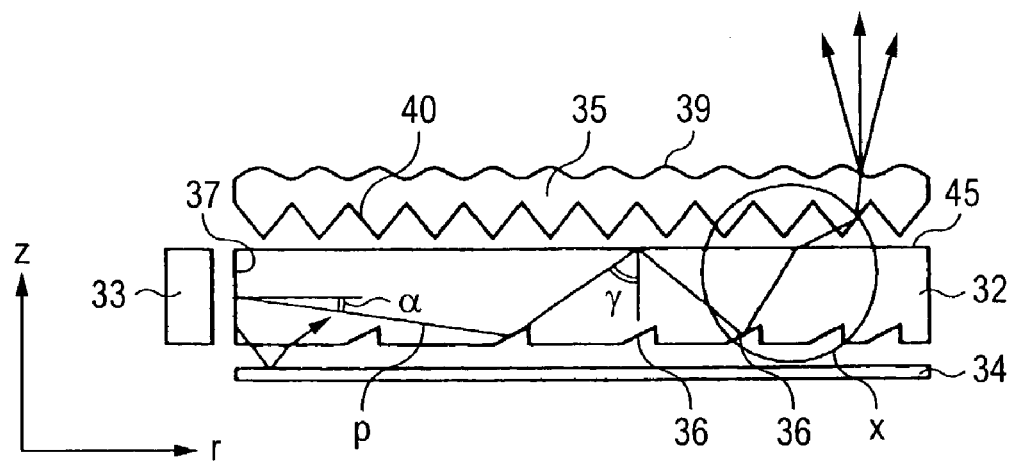
FIG. 13A is a schematic cross-sectional view showing the behavior of light in the surface light source device of FIG. 7.
Figure 13B:
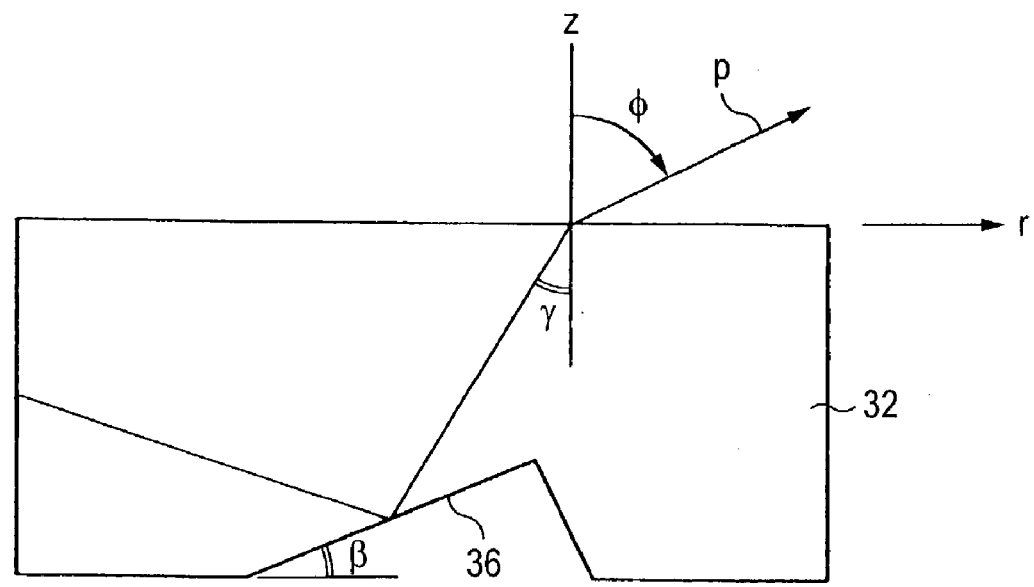
FIG. 13B is an enlarged view of an X portion of FIG. 13A.

Next, the behavior of light p in the surface light source device 31 will be described with reference to FIGS. 12, 13A and 13B. FIG. 12 is a diagram showing the behavior of light when viewed from the oblique upper side of the light guide plate 32, FIG. 13A is a diagram showing the light behavior on the section (zr plane) of the light guide plate 32, and FIG. 13B is an enlarged view of the X portion of FIG. 13A.

Figure 14:
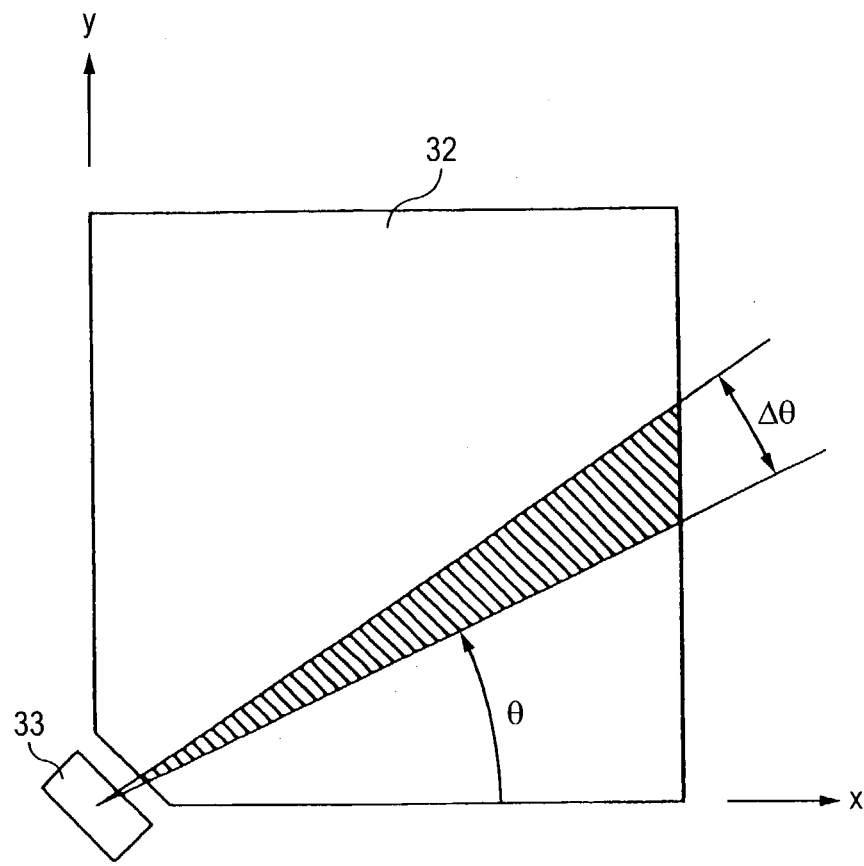
FIG. 14 is a diagram showing the relationship between the amount of light emitted from the light emitting portion within the range of Δθ and the area of the light guide plate within the range Δθ.

The light p emitted from the light emitting portion 33 is incident from the light incident face 37 into the light guide plate 32. The light p incident from the light incident face 37 into the light guide plate 32 propagates in the light guide plate 32 while spreading radially. In this time, it is preferable to design the optical element 44 provided on the light incident face 37 so that the amount of light in each direction of the light p spreading in the light guide plate 32 is proportional to the area of the light guide plate 32. Specifically, as shown in FIG. 14, it is preferable that the amount of light emitted within a spreading range $\Delta\theta$ located in any direction of $\theta$ from the side of the light guide plate 32 (the side in the x-axis direction) is set to be proportional to the area of the light guide plate contained in the range $\Delta\theta$ (the area of a hatched region of FIG. 14), whereby the brightness distribution of the surface light source device 31 in each direction can be made uniform.

The light p incident into the light guide plate 32 propagates in the light guide plate 32 so as to be far away from the light emitting portion 33 (i.e., in the r-axis direction) while repetitively totally-reflected between the upper and lower surfaces of the light guide plate 32. With respect to the light p incident to the lower surface of the light guide plate 32, the incident angle γ of the light p to the upper surface (light emission face 45) of the light guide plate 32 is reduced every time the light is reflected from the light diffusion pattern 36 having a triangular sectional shape, and the light p incident to the light emission face 45 at an incident angle γ smaller than the critical angle of the total reflection is transmitted through the light emission face 45 and emitted along the light emission face 45 to the outside of the light guide plate 32. Any light diffusion portion 36 is disposed so as to be perpendicular to the direction connecting the light emitting portion 33 and each diffusion pattern 36. Therefore, even when the light p propagating in the light guide plate 32 is diffused by the light diffusion patterns 36, the light p is not diffused and propagates on the plane (xy plane) of the light guide plate 32 although the light p is diffused on the plane (zr plane) which contains the direction connecting the light emitting portion 33 and the light diffusion pattern 36 concerned and is perpendicular to the light guide plate 32.

On the other hand, the light p which is not reflected by the lower surface of the light guide plate 32, but is transmitted through the lower surface of the light guide plate 32 is regularly reflected from the reflection plate 34 facing the lower surface of the light guide plate 32 and then returned into the light guide plate 32, and propagates in the light guide plate 32 again.

As a result, the emission range of the light emitted from the light emission face 45 of the light guide plate 32 is greatly limited, and if the inclination angle β of the light diffusion pattern 36 having the triangular section is equal to 12° for example, the emission direction ϕ of light on the zr plane perpendicular to the light emission face 45 is equal to about 45° to 90°.

The light emitted from the light emission face 45 of the light guide plate 32 does not spread in the θ direction, and the directivity angle Δϕ in the ϕ direction is also limited, so that the light concerned has extremely narrow directivity. As described above, the light which is emitted along the light emission face 45 with small spread and has strong directivity is bent in the direction perpendicular to the light emission face 45 when transmitted through the prism sheet 40 of the diffusion prism sheet 35, and also diffused by the uneven diffusion plate 39 of the diffusion prism sheet 35 so that the directivity is spread.

Next, the action of the diffusion prism sheet 35 will be described.

Figure 15:
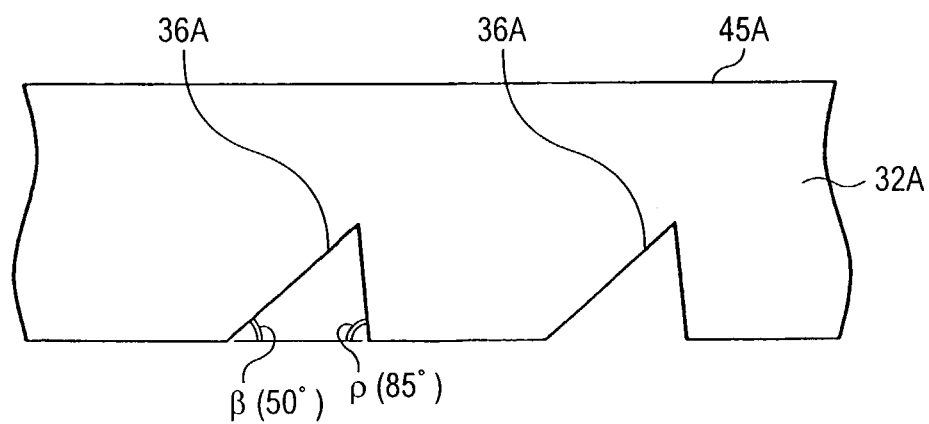
FIG. 15 is a diagram showing the structure of the light diffusion patterns to emit light in the vertical direction from the light emission face.

First, a case where light is emitted in the direction perpendicular to the light emission face without using the diffusion prism sheet 35 will be considered for comparison. In order to emit light vertically without using the diffusion prism sheet 35, the light must be emitted in the vertical direction by the light diffusion patterns of the light guide plate. In order to emit the light vertically by using the light diffusion patterns, it is necessary to increase the inclination angle of the slope surface of each light diffusion pattern 36A as shown in FIG. 15. In this case, the inclination angle β of the slope surface nearer to the light emitting portion 33 is equal to 50°, and the inclination angle p of the slope surface remoter from the light emitting portion 33 is equal to 85°.

Figure 16:
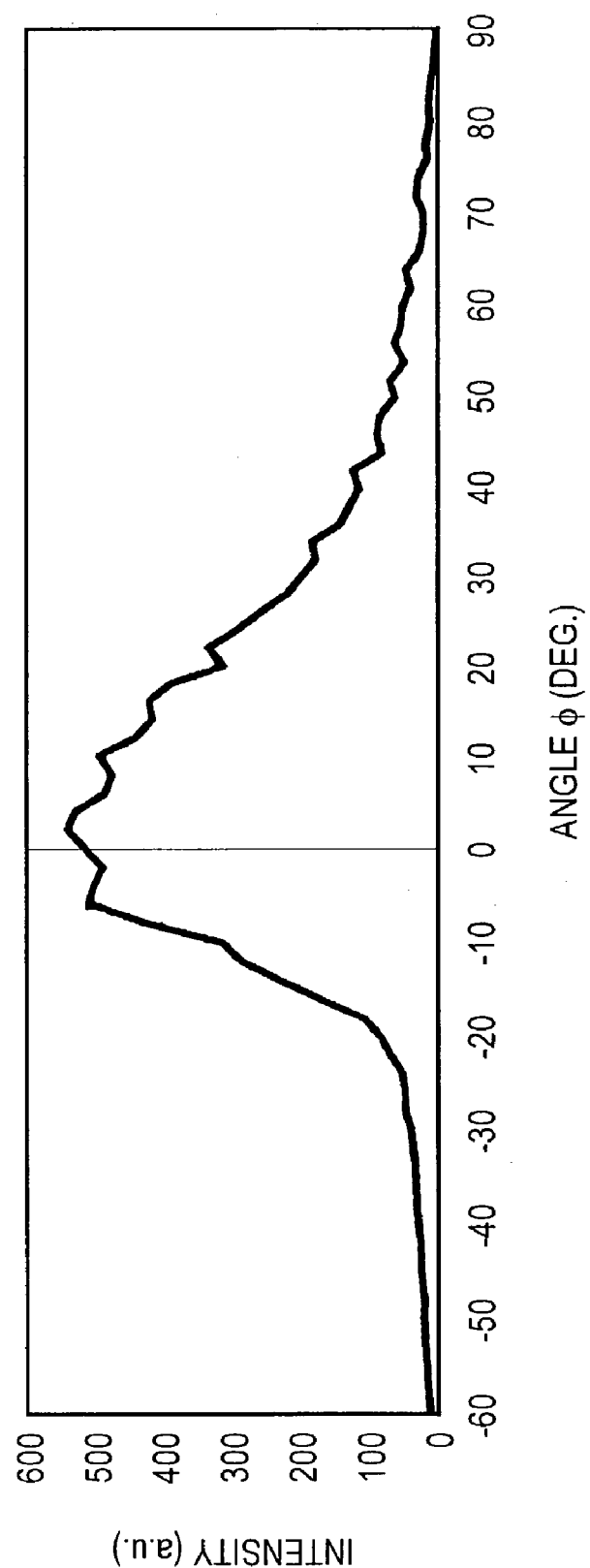
FIG. 16 is a diagram showing the directivity of light emitted from the light guide plate having the light diffusion pattern of FIG. 15 formed thereon.

FIG. 16 is a diagram showing the directivity on the zr plane when a light guide plate 32A having the light diffusion patterns 36A as shown in FIG. 15 is used. The abscissa axis represents the angle ϕ measured from the z-axis on the zr plane, and the ordinate axis represents the light intensity.

As is apparent from FIG. 16, the directivity is asymmetrical between an area nearer to the light emitting portion 33 (ϕ<0) (the left side of FIG. 16) and an area remoter from the light emitting portion 33 (ϕ>0) (the right side of FIG. 16), and the directivity in the area remoter from the light emitting portion 33 is remarkably broad. The angle ϕ at which the intensity is equal to a half of the peak value (i.e., the full width at half value) is equal to about −13° at the side nearer to the light source, and it is equal to about 26° at the side remoter from the light source. The full width at half value of the light intensity on a plane which is vertical to the zr plane and parallel to the z-axis is equal to about 5° (see FIG. 18).

Figure 6:
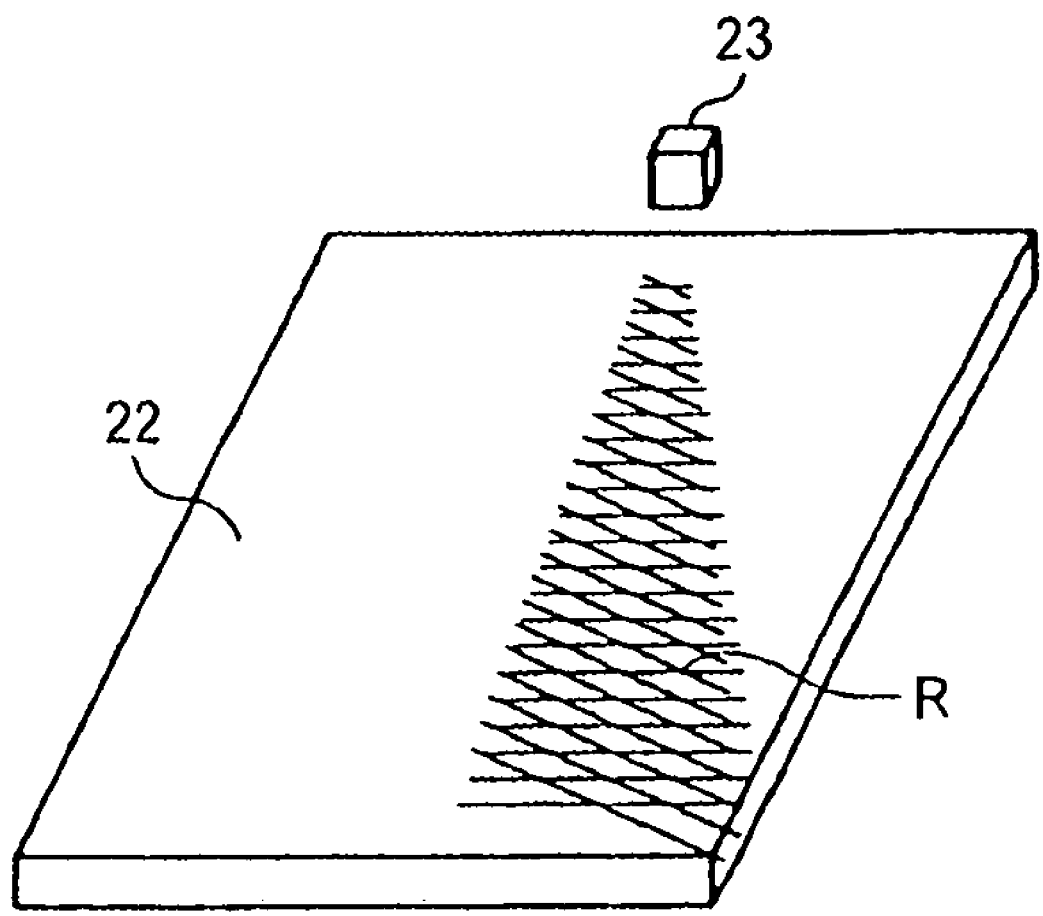
FIG. 6 is a diagram showing radial luminance unevenness (bright line) occurring in the surface light source device.
Figure 17:
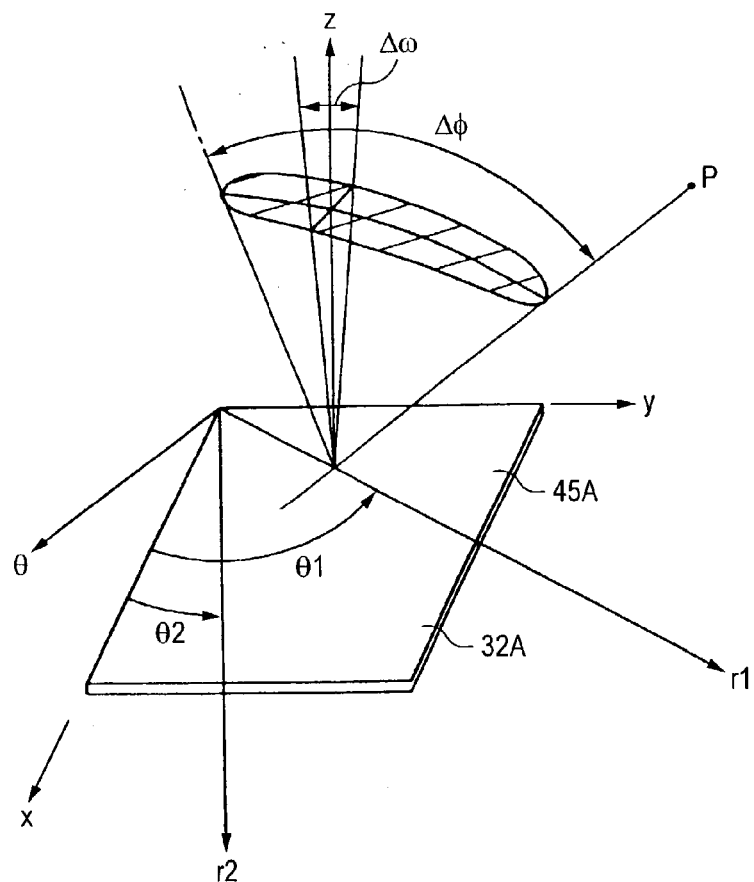
FIG. 17 is a perspective view showing the directivity of light emitted from the light guide plate of FIG. 15.

FIG. 17 shows light having directivity as shown in FIG. 16. As shown in FIG. 17, light emitted from the light emission face 45A (the hatched area represents an area to which the light is emitted) is spread to the range of Δϕ in the ϕ direction, and also it is spread to the range of Δω in the ω direction (on the plane zθ which is vertical to the zr plane and contains z-axis, the intersecting angle to the z-axis is represented by ω, and the directivity angle of light in the ω direction is represented by Δω). The directivity angle Δϕ in the ϕ direction is remarkably broad as compared with the directivity Δω in the ω direction. However, as shown in FIG. 17, the direction of the broad directivity angle Δφ is different between the light emitted from the light emission face 45A after propagating in the r1 direction in the light guide plate 32A and the light emitted from the light emission face 45A after propagating in the r2 direction in the light guide plate 32A. Therefore, when viewing the surface light source device from the direction of the point p, the light propagating in the r1 direction in the light guide plate 32A can be viewed, however, the light propagating in the r2 direction cannot be viewed, so that radial luminance unevenness R as shown in FIG. 6 appears on the light guide plate 32A.

The radial luminance unevenness would not vanish even if a diffusion plate is put on the light guide plate 32 of the comparative example as shown in FIG. 15. Furthermore, with the light guide plate 32A, the amount of light contained in the range of φ=±10° is equal to about 30% of the whole light amount. When the diffusion plate was put on the light guide plate 32A to reduce the radial luminance unevenness, the light emission efficiency was sharply reduced.

On the other hand, when the prism sheet 40 is put on the light guide plate 32, it is unnecessary to emit the light in the vertical direction by the light diffusion patterns 36, and the light emitted along the light emission face 45 is bent in the vertical direction by the prism sheet 40.

Figure 18:
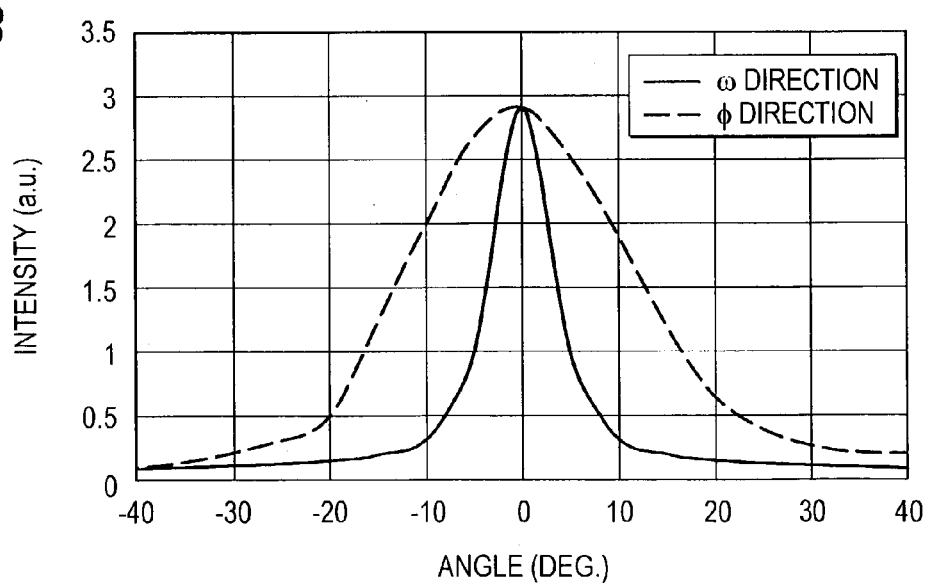
FIG. 18 is a diagram showing the directivity of ω-direction and the directivity of φ-direction of light transmitted through the prism sheet as shown in FIG. 11 disposed on the light guide plate.
Figure 19:
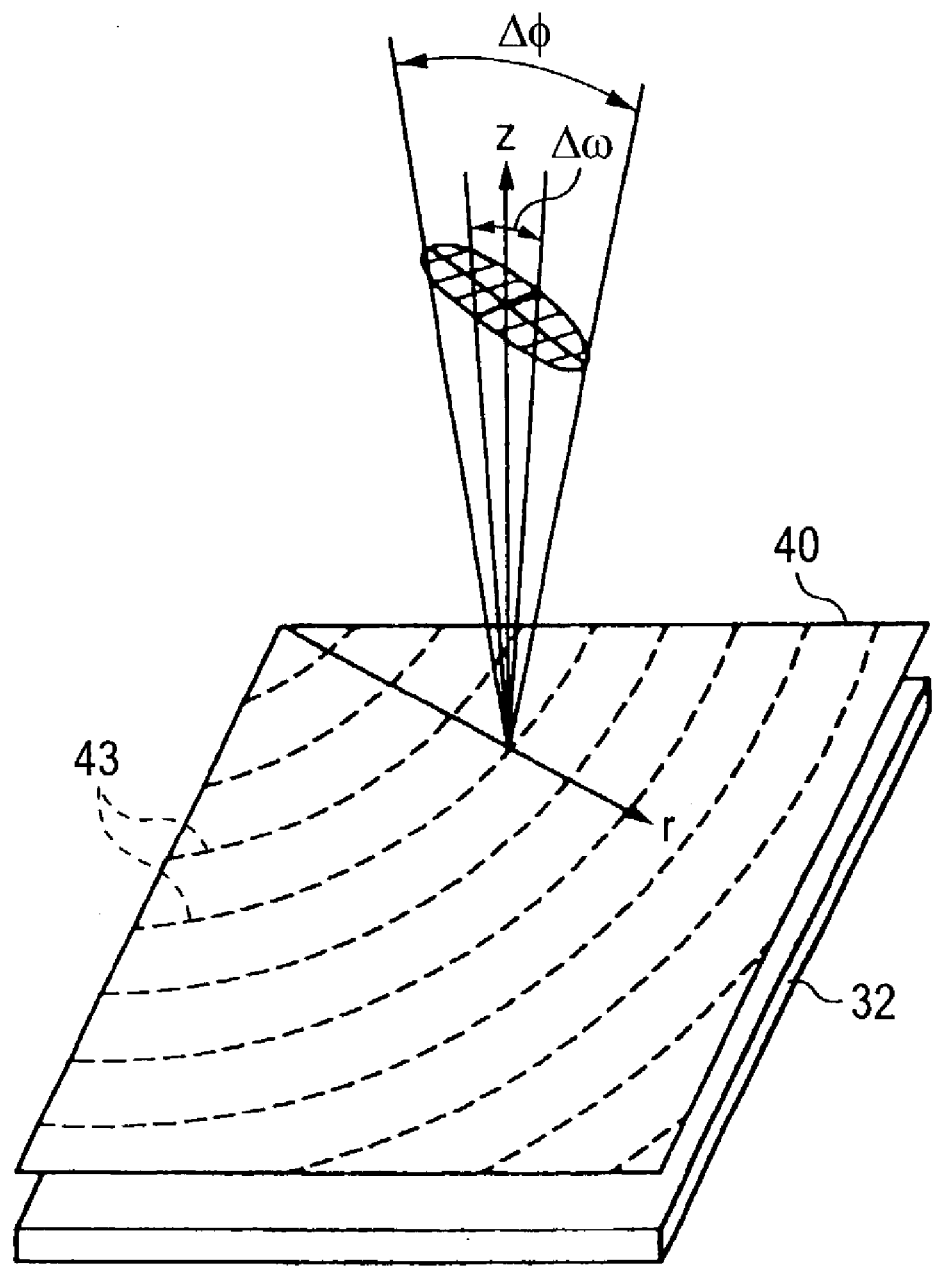
FIG. 19 is a perspective view showing the directivity of light when the prism sheet as shown in FIG. 11 is used.

FIG. 18 shows the directivity in the ω direction and the directivity in the φ direction of the light transmitted through the prism sheet 40 put on the light guide plate 32. Each directivity shows a symmetrical profile. As is apparent from FIG. 18, the angle at which the light intensity is equal to a half of the peak value (i.e., the full width at half maximum) is equal to about 5° in the ω direction and to about 15° in the φ direction, and the directivity angle Δφ of light in the φ direction is narrower as compared with the comparative example using no prism sheet.

As described above, when the prism sheet 40 comprising the arcuate prisms 43 with the light emitting portion 33 being located at the center is used, the directivity of the light transmitted through the prism sheet 40 is not varied in the ω direction, however, it is narrowed in the φ direction because the light is collected in the φ direction. Therefore, the difference (Δφ−Δω) between the directivity angle Δω in the ω direction and the directivity angle Δφ in the φ direction is reduced, and the radial luminance unevenness is reduced.

However, actually, the difference between the directivity angle Δω in the ω direction and the directivity angle Δφ in the φ direction can not be sufficiently reduced by only the prism sheet 40 (i.e., the full width at half maximum in the ω direction is equal to 10° and the full width at half maximum in the φ direction is equal to 30°, and thus the difference therebetween is equal to 20°). Therefore, the luminance unevenness still strongly appears although the radial luminance unevenness is reduced. Furthermore, the spread (full width at half maximum) of light in the ω direction is narrow (5°), and it cannot be applied to general use unless the light is more spread in the ω direction.

Figure 1:
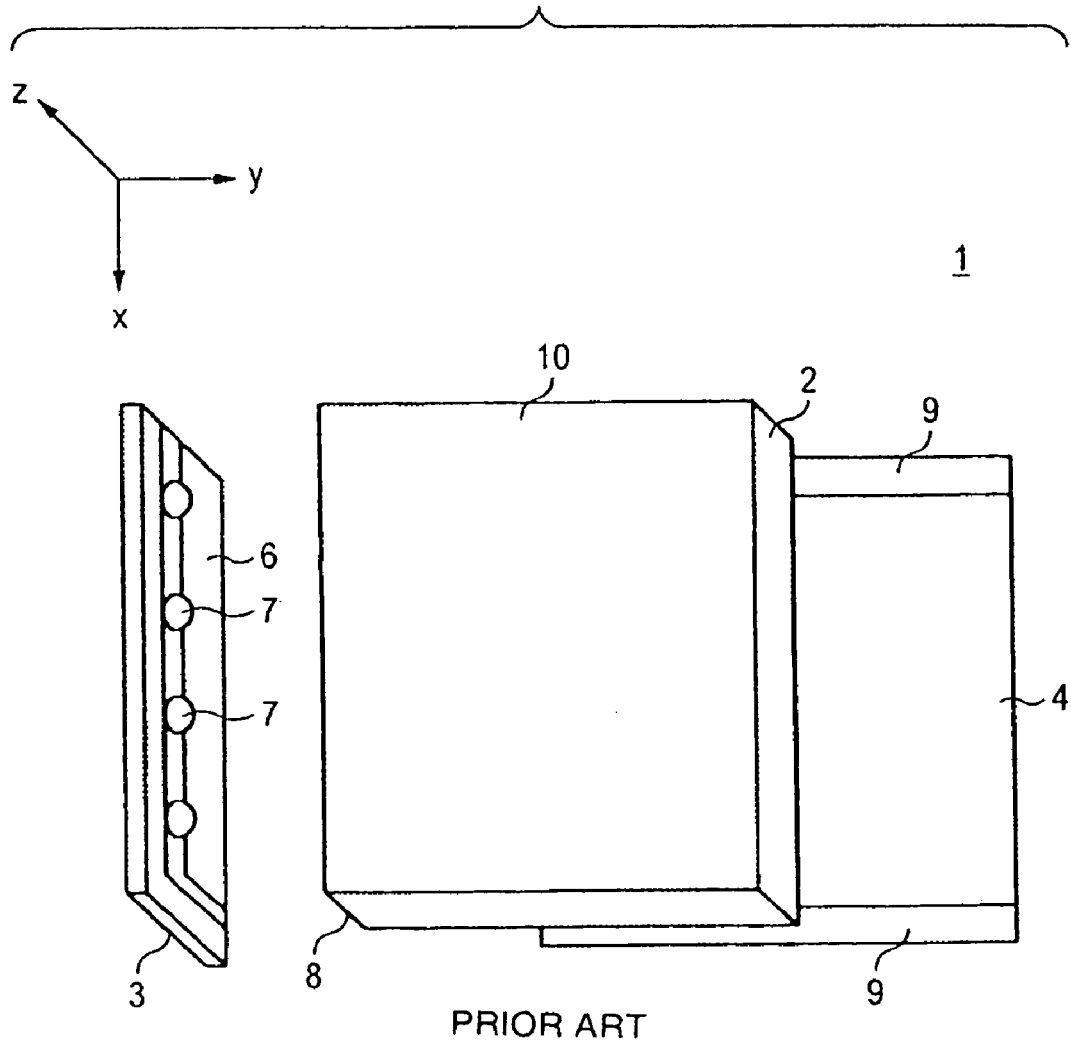
FIG. 1 is an exploded perspective view showing the structure of a conventional surface light source device.
Figure 2:
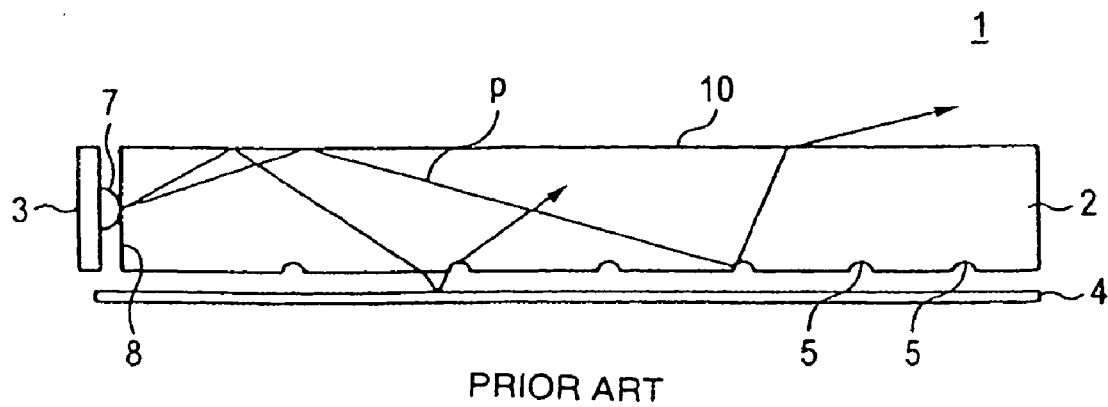
FIG. 2 is a cross-sectional view showing the surface light source device of FIG. 1.
Figure 3:
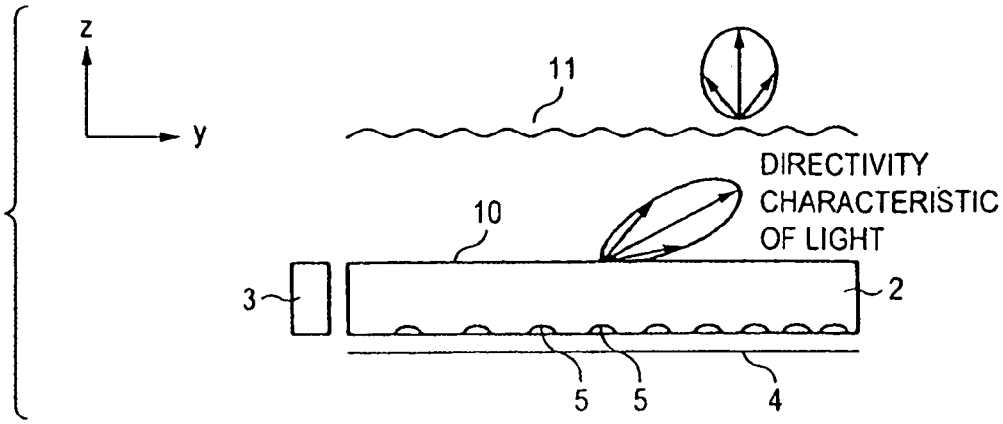
FIG. 3 is a diagram showing the directivity of light emitted from a light emission face of a light guide plate and the directivity of light transmitted through a diffusion plate in the surface light source device of FIG. 1.
Figure 4:
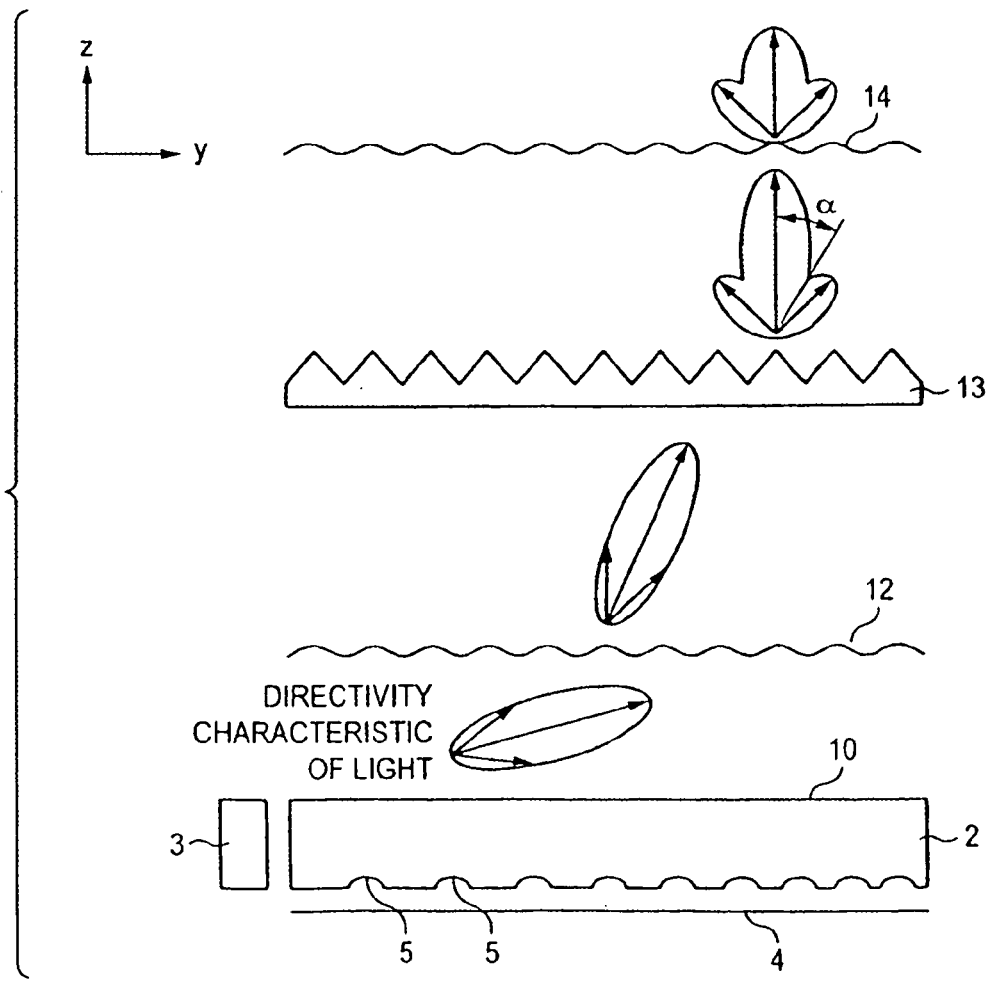
FIG. 4 is a diagram showing the directivity of light emitted from the light emission face of the light guide plate, the directivity of light transmitted through the diffusion plate, the directivity of light transmitted through a prism sheet and the directivity of light transmitted through a diffusion plate in the surface light source device of FIG. 1.
Figure 5:
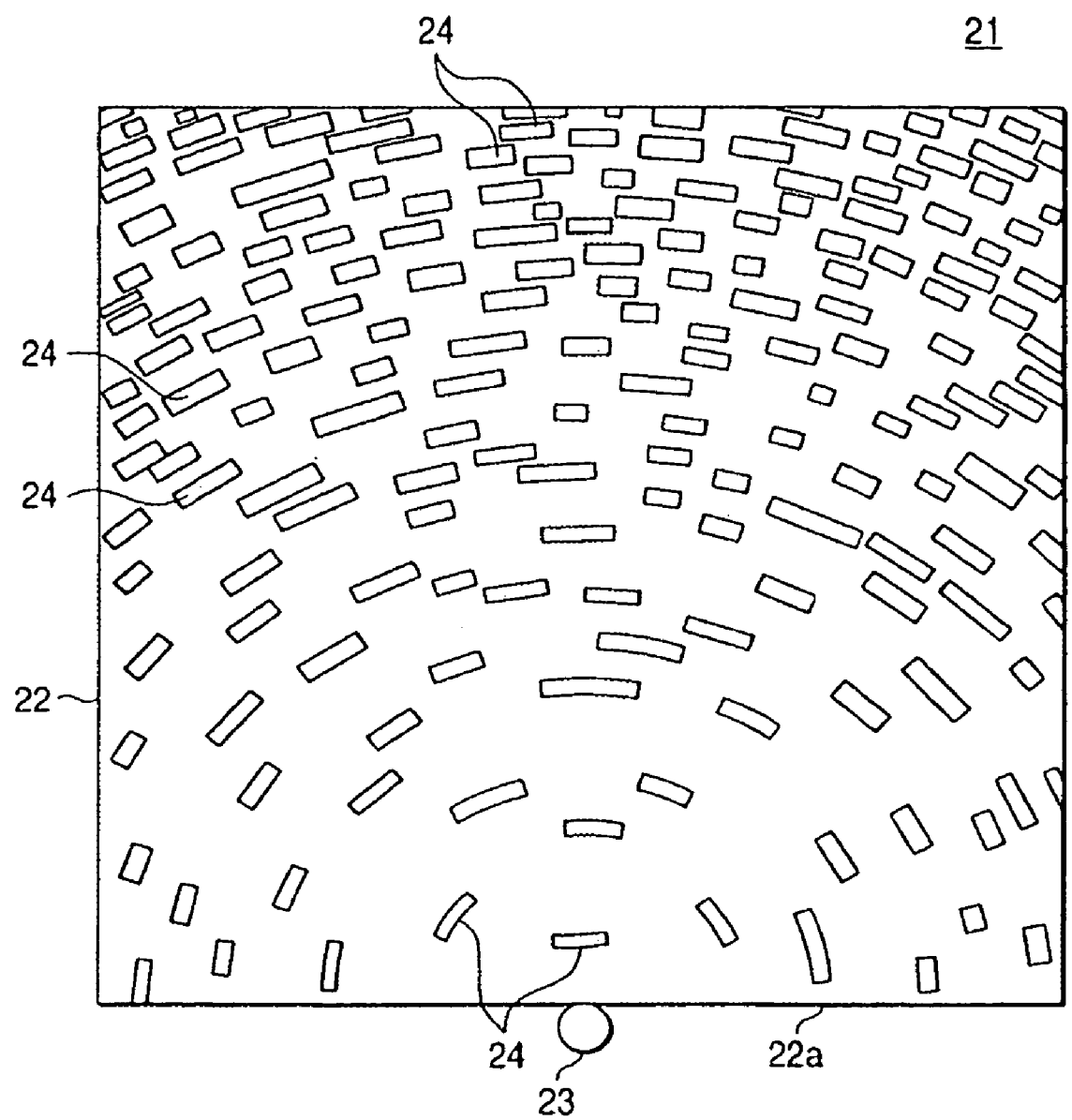
FIG. 5 is a schematic plan view showing the structure of a conventional surface light source device having a light emitting portion designed as a point light source.
Figure 20:
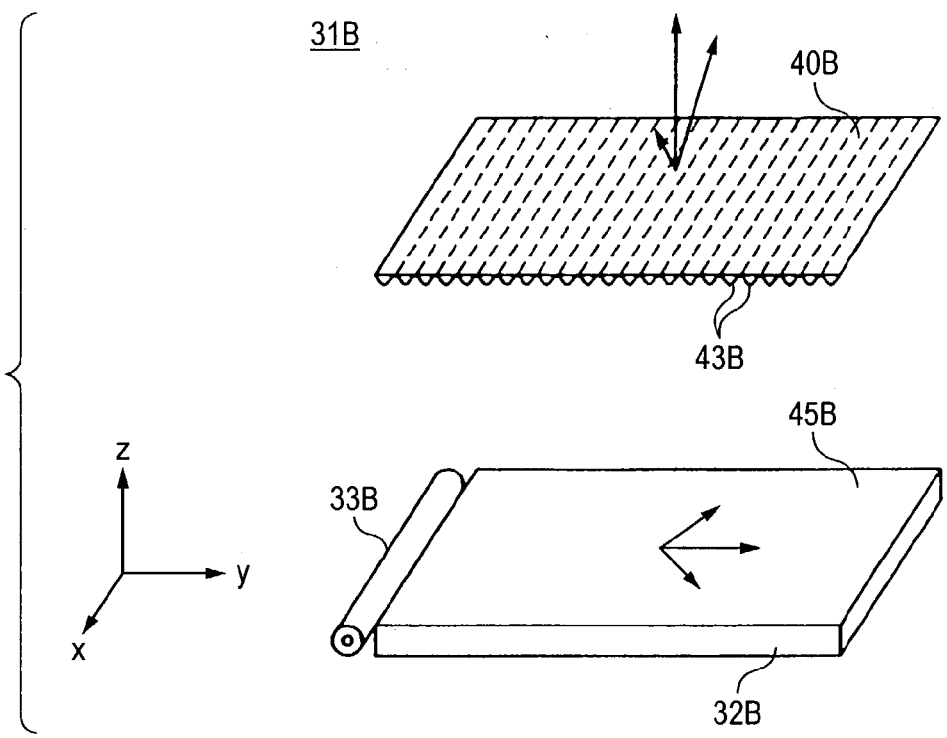
FIG. 20 is a perspective view showing a surface light source device using a linear light source and a prism sheet and the directivity thereof.
Figure 21:
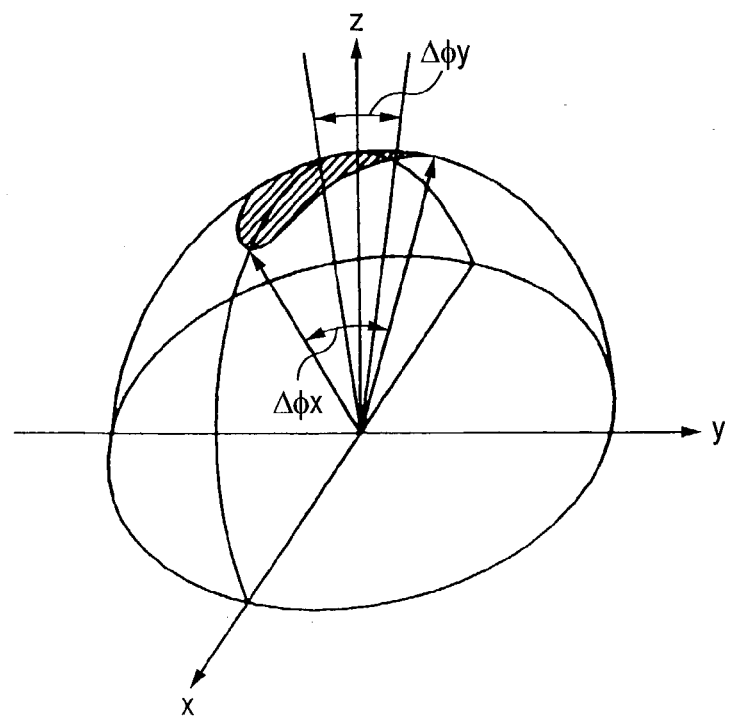
FIG. 21 is a perspective view showing the directivity of light emitted from the surface light source device.

As shown in FIG. 20, in the case of a surface light source device 31 using a linear light source 33B like a cold cathode ray tube or the light emitting portion 3 shown in FIG. 1, there has been proposed such a type that light is emitted along the surface of a light guide plate 32B and deflected in the vertical direction by a prism sheet 40B (for example, see Japanese Laid-open Patent Application No. Hei-11-84111). In this case, the extending direction of the prism 43B of the prism sheet 40 is parallel to the linear light source 33B, and as shown in FIG. 21, the directivity angle Δθx in the x-axis direction parallel to the prism 43B is remarkably large as compared with the directivity angle Δθy in the y-axis direction perpendicular to the prism 43B, and the anisotropy of the directivity angle is large. However, in the surface light source device 31B as described above, the direction of the anisotropy of the directivity angle is not varied with respect to the position on the light emission face 45B, and thus no radial luminance unevenness occurres.

On the other hand, in the case of the surface light source device 31 of the present invention, light radially-emitted from the light emitting portion 33 as the spot light source is diffused and reflected by the light diffusion patterns 36 formed concentrically on the lower surface of the light guide plate 32 to emit the light from the light emission face 45. Therefore, the anisotropy of the directivity of the emission light is varied depending on the position on the light emission face 45, and radial luminance unevenness occurs. That is, the radial luminance unevenness is a problem inherent to the surface light source having the light diffusion patterns 36 which are arranged concentrically with the light emitting portion 33 as the point light source, and the present invention aims to extinguish the luminance unevenness.

In the surface light source device 31B shown in FIG. 20, the directivity of light in the prism length direction (x-axis direction) of the prism sheet 40B is broad. On the other hand, in the surface light source device 31 of the present invention, the directivity of light in the prism length direction (θ-direction) of the prism sheet 40 is narrow, and this is just opposite to that of the surface light source device 31B. That is, in the manner of the present invention, it is necessary to spread the directivity of light in the prism length direction and narrow the directivity in the direction perpendicular to the prism length direction. In this case, the anisotropy of the directivity angle is excessively large in the surface light source device 31B of FIG. 20, so that the result becomes just opposite in that extra light is increased in the prism length direction and a required angle of visibility is not achievable in the direction perpendicular to the prism length direction. As described above, the present invention aims to solve the problem occurring in the surface light source device based on the original manner of the present invention.

Next, the action and effect of the uneven diffusion plate 39 used in the surface light source device 31 of the present invention will be described.

Figure 22:
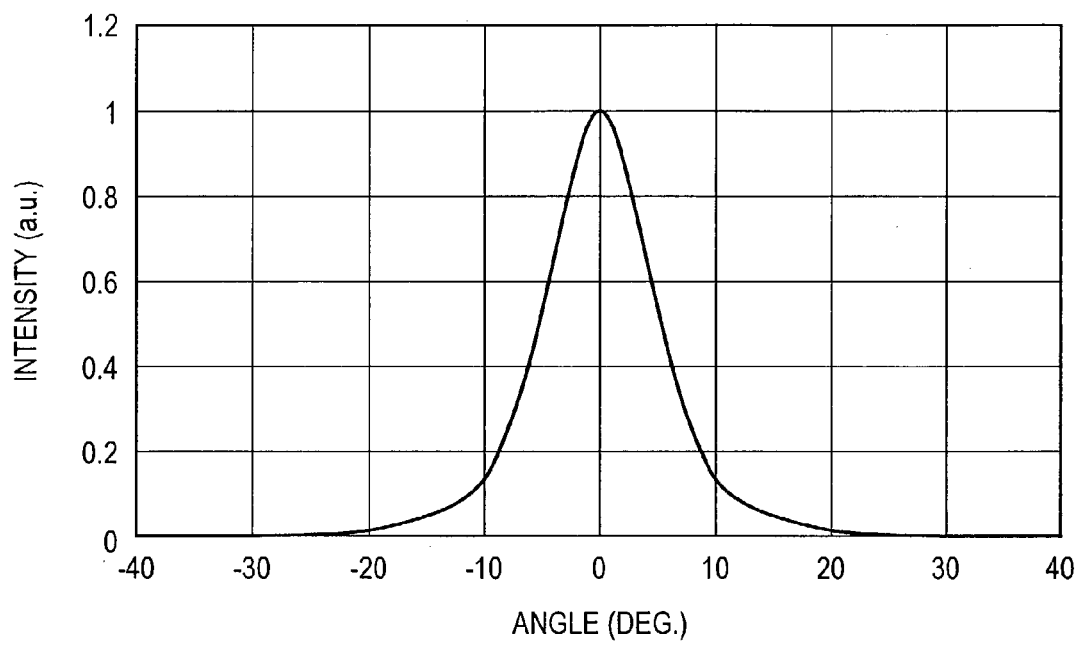
FIG. 22 is a diagram showing the directivity of a general diffusion plate.
Figure 23:
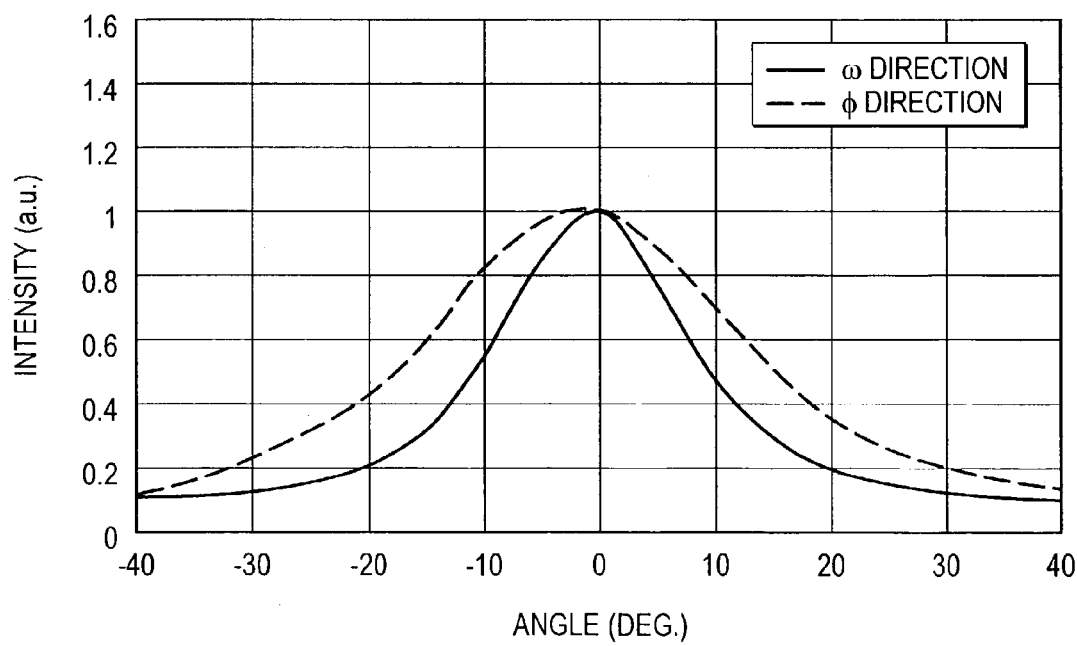
FIG. 23 is a diagram showing the directivities in the ω-direction and the φ-direction when the diffusion plate is put on the prism sheet of FIG. 11.

For comparison, a case where a generally-used diffusion plate is used as the uneven diffusion plate will be first described. A diffusion plate whose directivity is shown in FIG. 22 (the full width at half value is equal to 10°) when collimated light is incident from the-vertical direction to the diffusion plate is used as the general diffusion plate. When this general diffusion plate is put on the prism sheet 40, the directivity in the ω direction and the directivity in the φ direction are shown in FIG. 23. Here, it is assumed that ω represents an intersection angle to the z-axis on the zθ plane, and φ represents an intersection angle to the z-axis on the zr plane. The full widths at half maximum Δω and Δφ in the ω direction and in the φ direction are represented as follows:

$$\Delta\omega = 20°$$

$$\Delta\phi = 33°$$

The difference is as follows:

$$\Delta\omega - \Delta\phi = 13°$$

As compared with the case where only the prism sheet 40 is equipped, the difference of the full width at half maximum is reduced by 38%. Therefore, the radial luminance unevenness is reduced to a certain extent, however, the luminance unevenness still appears. In consideration of the light emitted in the actually effective direction, about 23% of light is contained in the full width at half maximum $\Delta\omega=20°$. That is, 77% of light is wasted. When shifted from the vertical direction by $\omega=2.5°$, the brightness is reduced by about 20%, and the luminance is viewed as being different between the right and left eyes.

Figure 24:
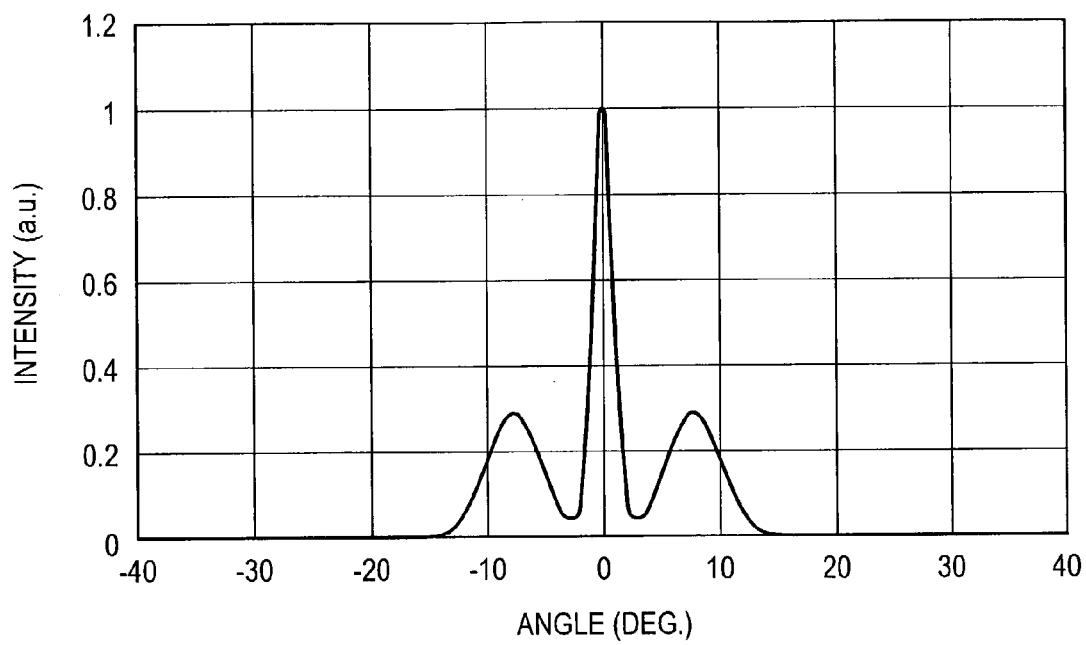
FIG. 24 is a diagram showing the directivity when collimated light is vertically incident to an uneven diffusion plate as shown in FIGS. 10A to 10C.
Figure 25:
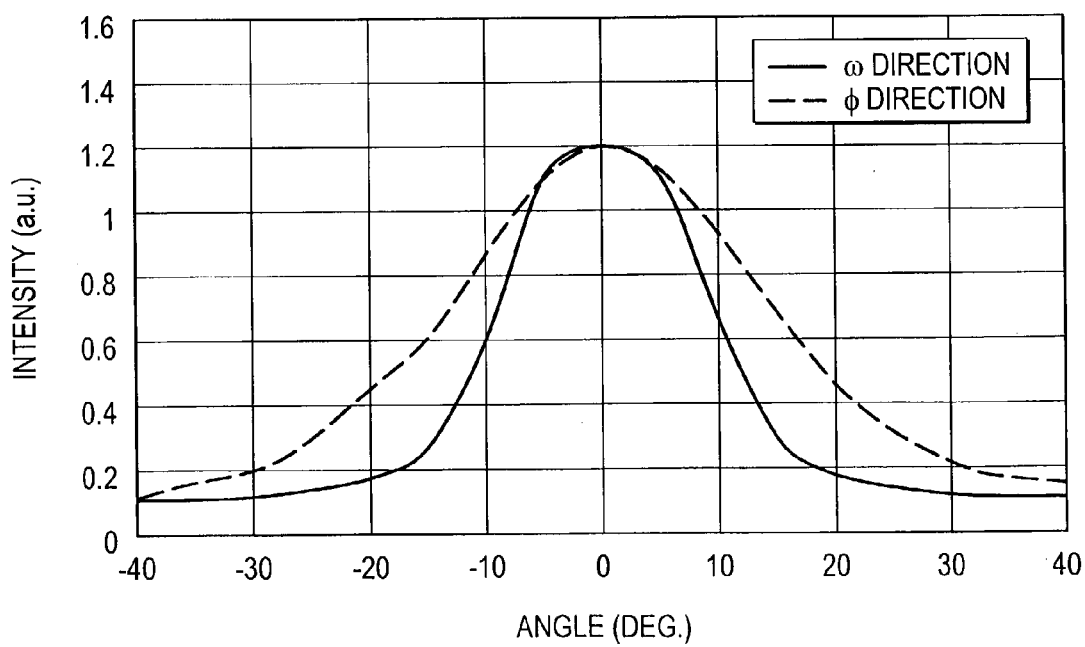
FIG. 25 is a diagram showing the directivities of the ω-direction and the-direction when the uneven diffusion plate is put on the prism sheet shown in FIG. 11.

On the other hand, the directivity when collimated light is incident vertically to the uneven diffusion plate 39 as shown in FIG. 10 is shown in FIG. 24. When the uneven diffusion plate 39 is put on the prism sheet 40, the directivity in the $\omega$ direction and the directivity in the $\phi$ direction are as shown in FIG. 25. That is, the full widths at half maximum $\Delta\omega$ and $\Delta\phi$ in the $\omega$ direction and in the $\phi$ direction are as follows:

$\Delta\omega=20°$ $\Delta\phi=29°$

The difference is as follows:

$\Delta\phi-\Delta\omega=9°$

As compared with the case where only the prism sheet 40 is used, the difference of the full width at half maximum is reduced by 58%. Accordingly, the radial luminance unevenness can be greatly reduced. Furthermore, the amount of light contained in the full width at half maximum $\Delta\omega=20°$ in the narrowest direction is equal to about 30% of the total light amount, and waste light is reduced to 70%. Therefore, the brightness in the vertical direction is enhanced by about 20% as compared with the general diffusion plate. Further, the brightness reducing rate at a place which is far away from the vertical direction by $\omega=5°$ is reduced to 10% or less, and thus there can be substantially overcome the problem that viewing of the screen is disturbed by the luminance unevenness.

The reason why the above problem can be overcome is as follows.

Light emitted from the light guide plate 32 has a somewhat smooth profile as shown in FIG. 26A. On the other hand, when the diffusion characteristic of the uneven diffusion plate (the directivity to the vertical incident light) has a smooth profile like the emission light from the light guide plate as shown in FIG. 26B, the light emitted from the light guide plate and transmitted through the uneven diffusion plate is further smoothened and it has a profile as shown in FIG. 26B (this is similar to such a phenomenon that the center is sharpened by auto-correlation). In the case of the directivity as described above, if light is spread in the $\omega$ direction at some level, extremely strong diffusion is needed. Therefore, the light is spread in the $\phi$ direction, and thus the difference ($\Delta\phi-\Delta\omega$) is not so reduced. Furthermore, waste light in the oblique direction is also increased.

Figure 27A:
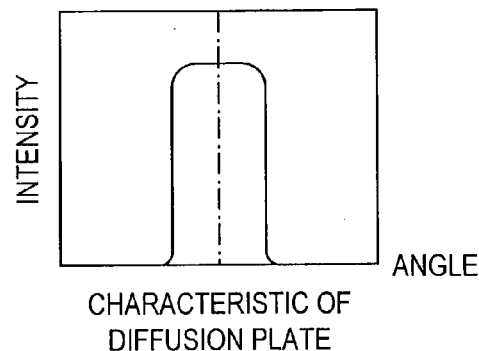
FIG. 27A is a diagram showing the diffusion characteristic of the diffusion plate, FIGS. 27B and 27B' are diagrams showing the directivity of light emitted from the light guide plate.
Figure 27B:
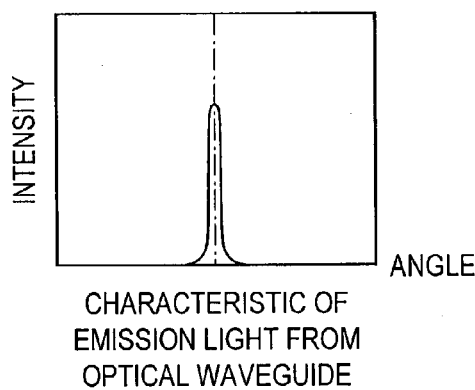
FIG. 27C is a diagram showing the directivity of the light having the directivity as shown in FIG. 27B after the light is transmitted through the diffusion plate having the characteristic as shown in FIG. 27A, and FIG. 27C' is a diagram showing the directivity of the light having the directivity as shown in FIG. 27B' after the light is transmitted through the diffusion plate having the characteristic of FIG. 27A.
Figure 27B:
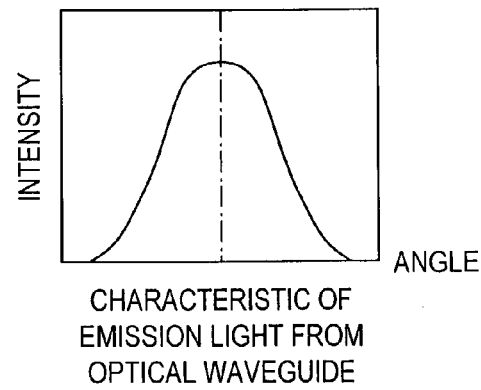
Figure 27C:
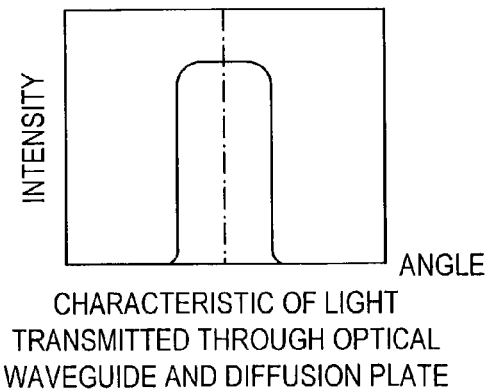
Figure 27C:
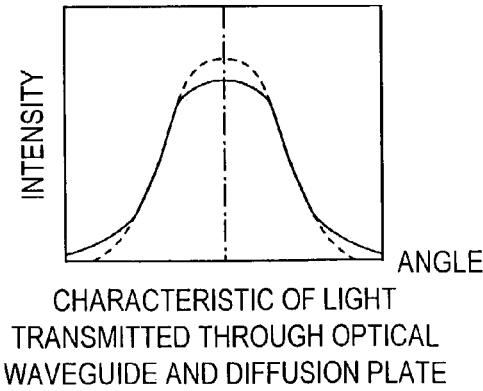

On the other hand, when the diffusion characteristic of the uneven diffusion plate is near to a rectangular shape as shown in FIG. 26C, the profile of light emitted from the light guide plate and transmitted through the uneven diffusion plate is near to the rectangle as shown in FIG. 26C'. $\Delta\omega$ is greatly spread by relatively small diffusion, however, $\Delta\phi$ is not so spread, so that the difference ($\Delta\phi-\Delta\omega$) is reduced. For example, when a diffusion plate having a diffusion characteristic as shown in FIG. 27A which is sufficiently larger than the directivity angle $\Delta\omega$ (shown in FIG. 27B) in the $\omega$ direction of the light guide plate and sufficiently smaller than the directivity angle $\Delta\phi$ (shown in FIG. 27B') in the $\phi$ direction of the light guide-plate is put on the light guide plate, the directivity angle $\Delta\omega$ of light transmitted through the uneven diffusion plate in the $\omega$ direction is dependent on the directivity of the diffusion plate having the diffusion characteristic broader than the directivity angle of light emitted from the light guide plate as shown in FIG. 27C. On the other hand, the directivity of light emitted from the light guide plate in the $\phi$ direction is originally spread as shown in FIG. 27B', and thus the directivity of light transmitted through the uneven diffusion plate is slightly smoothened at the center and at the both ends, however, the full width at half maximum thereof is not varied as shown in FIG. 27C'. Accordingly, when the directivity angle of light emitted from the light guide plate is narrow in the $\omega$ direction and broad in the $\phi$ direction, the effect of reducing the difference ($\Delta\phi-\Delta\omega$) by using a diffusion plate having small diffusion can be achieved.

Furthermore, in the case of a diffusion characteristic having peaks at both the sides between which the direction vertical to the light guide plate is sandwiched as shown in FIG. 26D, the profile of light emitted from the light guide plate and transmitted through the uneven diffusion plate is further near to the rectangular shape as shown in FIG. 26D', and the rate of light within the needed angle is increased.

Figure 28A:
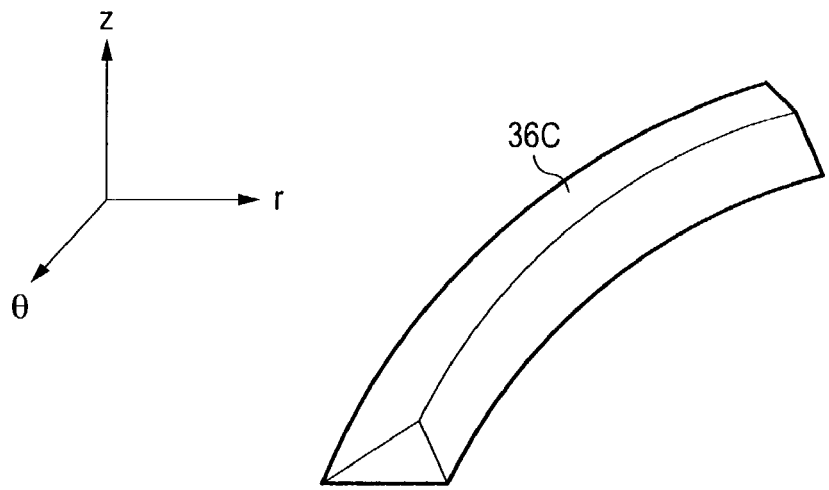
FIGS. 28A to 28C are perspective view, plan view and side view showing light diffusion patterns of another embodiment, respectively.
Figure 28B:
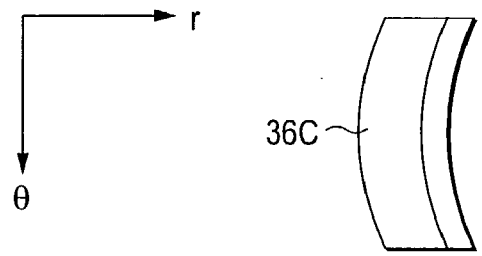
Figure 28C:
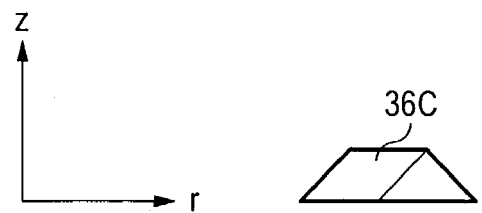
Figure 29:
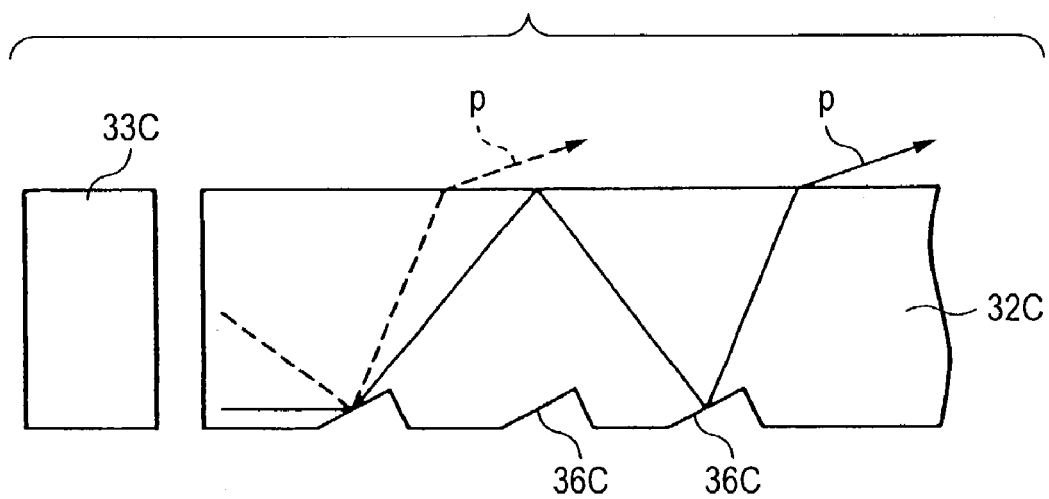
FIG. 29 is a diagram showing light emitted from a light guide plate having light diffusion patterns as shown in FIGS. 28A to 28C.

In order to spread the directivity of the emission light in the $\theta$ direction or $\omega$ direction, a method of curving the light diffusion patterns along the $\theta$ direction like light diffusion patterns 36C shown in FIGS. 28A, 28B and 28C may be considered. Here, the $\theta$-axis is set to the direction perpendicular to the zr plane. According to this method, with respect to light p which impinges against a light diffusion pattern 36C and deflected therefrom, light having a large impinging angle against the light diffusion pattern 36C like light p indicated by a broke line of FIG. 29 is emitted with one reflection from the light diffusion pattern 36C. However, light having a small impinging angle against the light diffusion pattern 36C at a first impingement time like light p indicated by a solid line of FIG. 29 is emitted from the light guide plate 32C after it is reflected from the light diffusion patterns 36C at plural times. Therefore, the spread in the $\theta$ direction is increased, and the spread in the $\theta$ direction of light p emitted from the light guide plate 32C is more increased as it is remoter from the light emitting portion 33C. However, the surface light source device 31 of the present invention has no such a problem because the light diffusion patterns 36 are linear.

In the case of the light diffusion patterns 36C shown in FIGS. 28A, 28B and 28c, when viewed from the vertical direction to the light guide plate 32C, the travel direction of light is bent after the light first impinges against the light diffusion pattern 36C, and thus it is difficult to design the light diffusion patterns so as to achieve uniform brightness. Accordingly, the deflection angle in the $\theta$ direction by the light diffusion patterns 36C cannot be much increased. If the deflection angle is set to a large value, the manner to be used is different from a manner in which light is radially straightly spread and emitted by concentric patterns as in the case of the present invention, but it is merely a normal system in which light is spread by diffusing the light. The deflection angle on the zr plane and the deflection angle on the xy plane are preferably set to about 4:1 (preferably, 10:1) on average, however, for the above reason, it is difficult to implement such deflection angles by the light diffusion patterns 36C as shown in FIGS. 28A, 28B and 28C.

Figure 30:
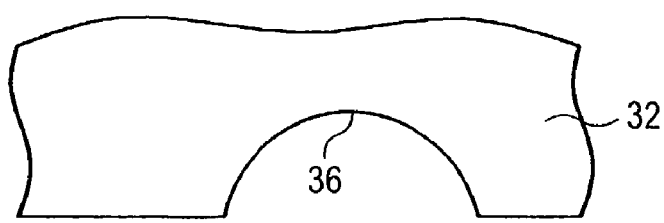
FIG. 30 is a cross-sectional view showing a light diffusion pattern of another embodiment.

In the above-described embodiment of the present invention, the light diffusion pattern 36 has a triangular shape in section. However, the sectional shape of the light diffusion pattern 36 may be arcuate or semi-circular in section as shown in FIG. 30. However, the light diffusion pattern 36 having an arcuate or semi-circular shape in section is not preferable because the directivity angle Δφ in the φ direction of light emitted from the light emission face 45 is spread. Also in the case of the light diffusion pattern 36 having the triangular shape in section, it is not preferable to mix light diffusion patterns 36 which are different in inclination angle β for the same reason as the above. Further, in place of use of the light diffusion pattern 36, light in the light guide 32 may be diffused by hologram or the like to emit the light from the light emission face 45.

Figure 31:
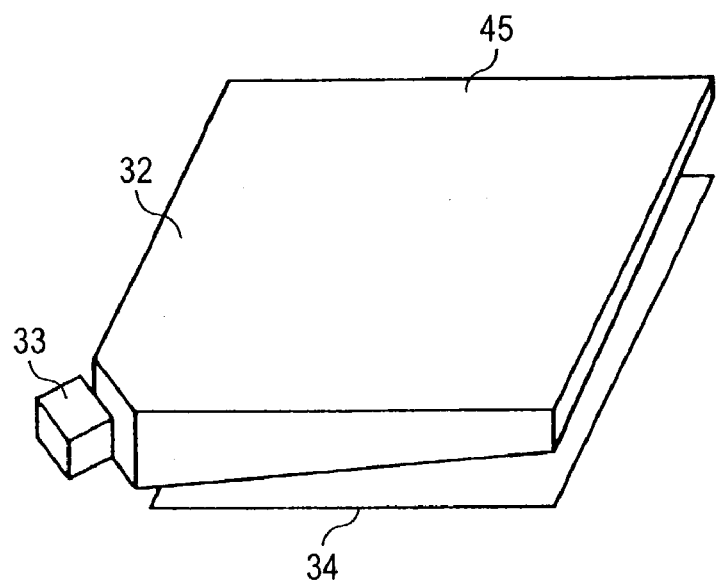
FIG. 31 is a perspective view showing a surface light source device using a light guide plate of another embodiment.

As a method of emitting the light in the light guide plate 32 from the light emission face 45, a wedge type light guide plate 32 which is thinner as it is remoter from the light emitting portion 33 may be used as shown in FIG. 31. However, in the case of the light guide plate 32 having a rectangular shape in plan view, the area of the light guide plate from which light is emitted is varied depending on the θ direction (see FIG. 14), and the amount of light emitted from the light emitting portion 33 is varied depending on the direction (angle θ). Therefore, it is impossible to make the light emitting face 45 uniformly shine by merely designing the light guide plate 32 in the wedge shape. If the light emitting face 45 is made to uniformly shine by merely designing the light guide plate 32 in the wedge shape, the planar shape of the light guide plate 32 must be designed in a complicated shape. Accordingly, even when the light guide plate 32 is designed in the wedge shape, it is required to be combined with the light diffusion patterns 36.

(Second Embodiment)

Figure 32:
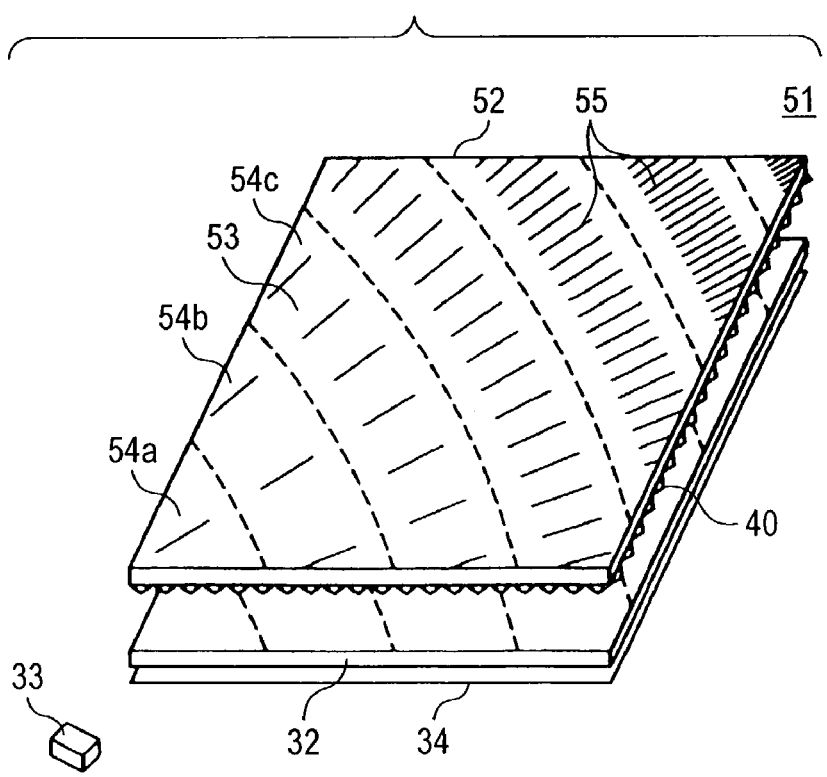
FIG. 32 is a perspective view showing the structure of a surface light source device according to a second embodiment of the present invention.
Figure 33A:
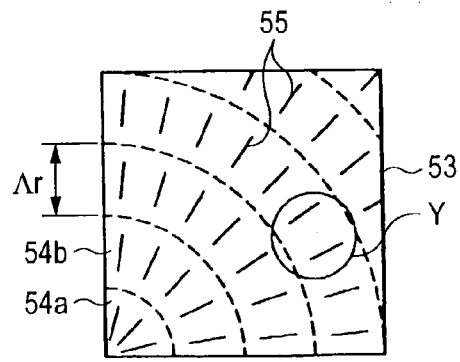
FIG. 33A is a plan view showing an uneven diffusion plate used for the surface light source device of FIG. 32.
Figure 33B:
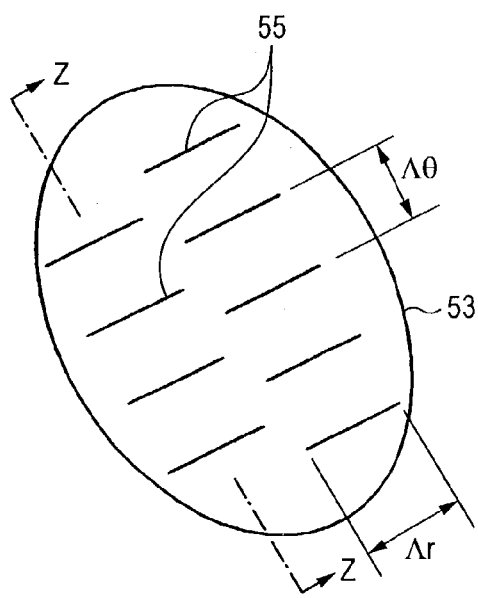
FIG. 33B is an enlarged view of a Y portion of FIG. 33A
Figure 33C:
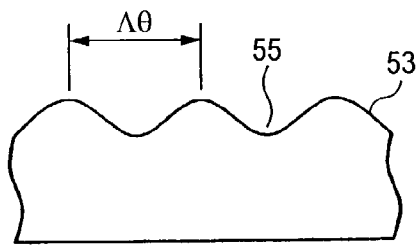
FIG. 33C is a cross-sectional view taken along Z—Z line.

FIG. 32 is a perspective view showing the structure of a surface light source device according to another embodiment of the present invention. FIG. 33A is a plan view showing an uneven diffusion plate 53 of a diffusion prism sheet 52 used in the surface light source device 51, FIG. 33B is an enlarged view of a Y portion of FIG. 33A, and FIG. 33C is a cross-sectional view taken along Z—Z line of FIG. 33B. In the surface light source device 51 of this embodiment, the structures of the light guide plate 32, the light emitting portion and the reflection plate 34 are the same as the first embodiment.

The diffusion prism sheet 52 has the uneven diffusion plate 53 formed on the obverse surface thereof and the prism sheet 40 formed on the back surface thereof. The prism sheet 40 is the same as the first embodiment (see FIG. 11). The uneven diffusion plate 53 is designed to diffuse light transmitted through the prism sheet 40 only in the ω direction. That is, as shown in FIG. 33A, the uneven diffusion plate 53 is sectioned into band-shaped areas 54a, 54b, . . . each of which has a width Δr and is shaped to be concentric around the light emitting portion 33. In each of the areas 54a, 54b, . . . a sinusoidal uneven pattern 55 is formed having a period Λθ sufficiently smaller than the width Δr extending along the θ direction as shown in FIGS. 33B and 33C. The period Λθ is slightly different between the respective neighboring areas 54a, 54b, . . . For example, the width of the areas 54a, 54b, . . . is set to Δr=100 μm. With respect to the pattern period of the uneven pattern 55, the period Λθ of the areas is alternately varied to one of 9 μm and 10 μm. This is because small Moire fringes are made to occur intentionally in order to prevent large-period visible Moire fringes due to the uneven patterns 55 between the areas 54a, 54b, . . . In order to suppress the Moire fringes, the width Δr of the areas 54a, 54b, or the period Λθ of the uneven patterns 55 may be randomly varied.

Since the period Λθ is varied at the boundary between the areas 54a, 54b, . . . , light is slightly diffused even in the φ direction in the neighborhood of the boundary. However, the diffusion in the φ direction can be reduced by satisfying the inequality: Δr>>Λθ, so that most of the diffusion can be based on the diffusion in ω direction. Further, the sectional shape of the uneven pattern 55 is not limited to the waved shape in section as shown in FIG. 33C, and it may be a triangular waved shape in section, a trapezoidal shape in section or a cylindrical-lens-array shape in section.

Figure 34:
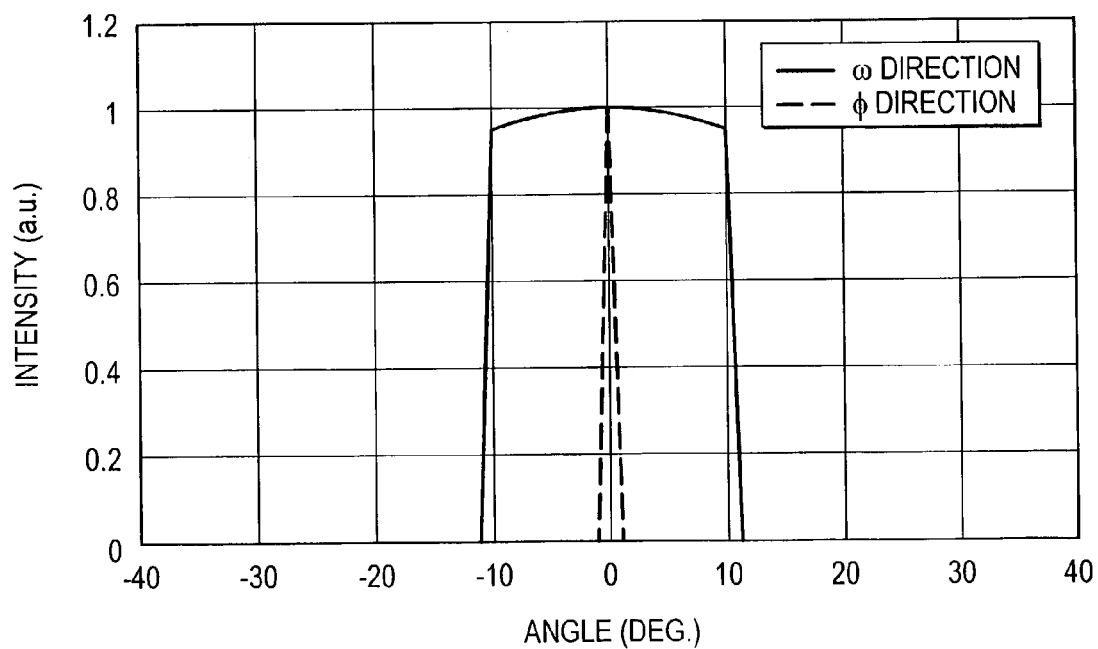
FIG. 34 is a diagram showing the diffusion characteristics in the ω-direction and the φ-direction when collimated light is vertically incident to the uneven diffusion plate used in the diffusion prism sheet.

FIG. 34 is a diagram showing diffusion characteristics in the ω direction and in the φ direction when collimated light is incident vertically to the uneven diffusion plate 53 used in this embodiment. The abscissa axis represents the angles (ω, φ) measured from the z-axis, and the ordinate axis represents the light intensity. As is apparent from FIG. 34, the uneven diffusion plate 53 has a large diffusion characteristic in the ω direction (the full width at half maximum Δω=20°), however, it has little diffusion characteristic in the φ direction.

Figure 35:
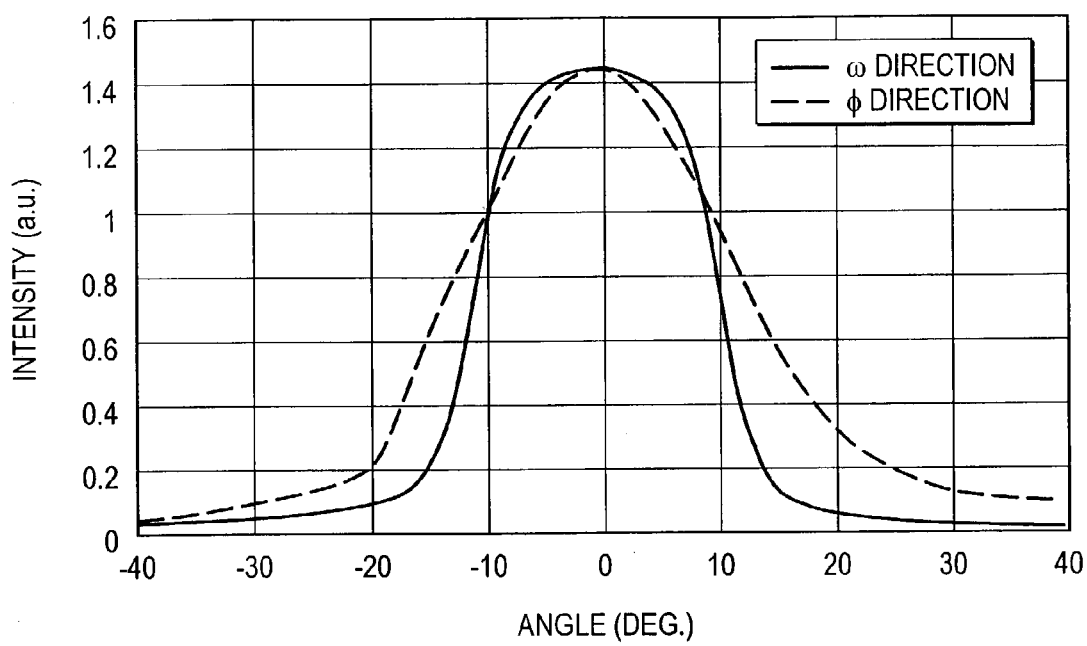
FIG. 35 is a diagram showing the directivity angles of light in the ω-direction and the φ-direction when the uneven diffusion plate having the characteristic as shown in FIG. 34 is put on the light guide plate.

FIG. 35 is a diagram showing the directivity angles of light in the ω direction and in the φ direction when the uneven diffusion plate 53 is put on the light guide plate 32 described in the first embodiment. The abscissa axis represents the angles (ω, φ) measured from the z-axis, and the ordinate axis represents the intensity of light emitted in each direction. As is apparent from FIG. 35, with respect to the light transmitted through the uneven diffusion plate 53, the full width at half maximum in the ω direction (Δω) is equal to about 20°, and the full width at half maximum in the φ direction (Δφ) is equal to about 26°, and the difference thereof is as follows:

$$\Delta\phi - \Delta\omega = 6°$$

The difference of the full width at half maximum is reduced by 71% as compared with the case where only the prism sheet 40 is used. Therefore, the radial luminance unevenness hardly appears.

In the characteristic of FIG. 35, the light amount contained in the range of the full width at half maximum Δω=20° is equal to 44% of the total light amount, and waste light is reduced to 56%. Accordingly, the brightness in the vertical direction in the surface light source device 51 is increased by 45% as compared with the normal diffusion plate.

(Third Embodiment)

Figure 36:
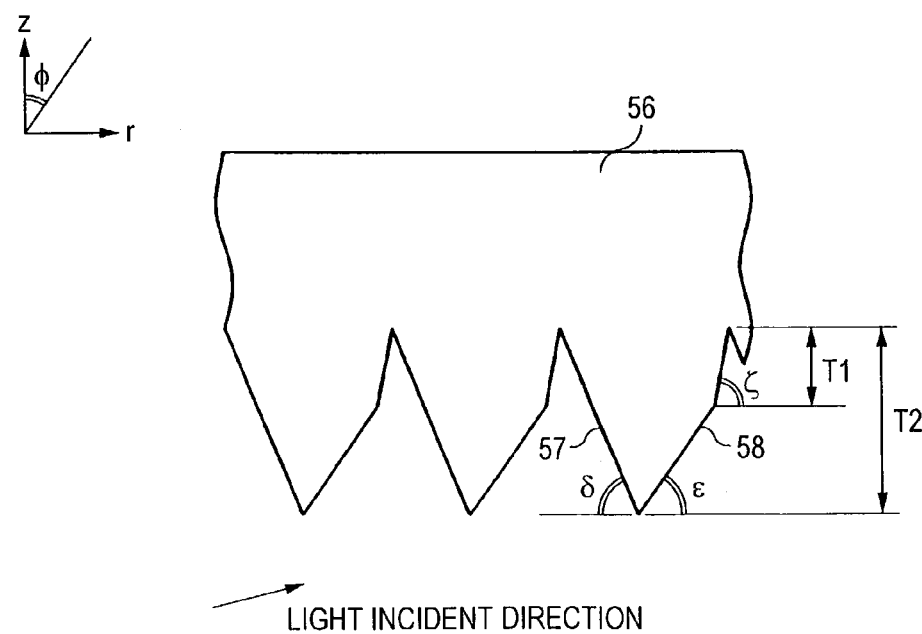
FIG. 36 is a cross-sectional view showing a prism sheet of an uneven diffusion plate used in a third embodiment of the present invention.

FIG. 36 shows the sectional shape on the zr plane of the prism sheet 56 of the uneven diffusion plate used in another embodiment of the present invention. In this prism sheet 56, a slope surface (reflection face) 58 remoter from the light emitting portion 33 in the slope surfaces constituting the prism in section is bent so as to project from some midpoint thereof to narrow the directivity in the φ direction, thereby enhancing the brightness in the vertical direction and also reducing the radial luminance unevenness.

Figure 37:
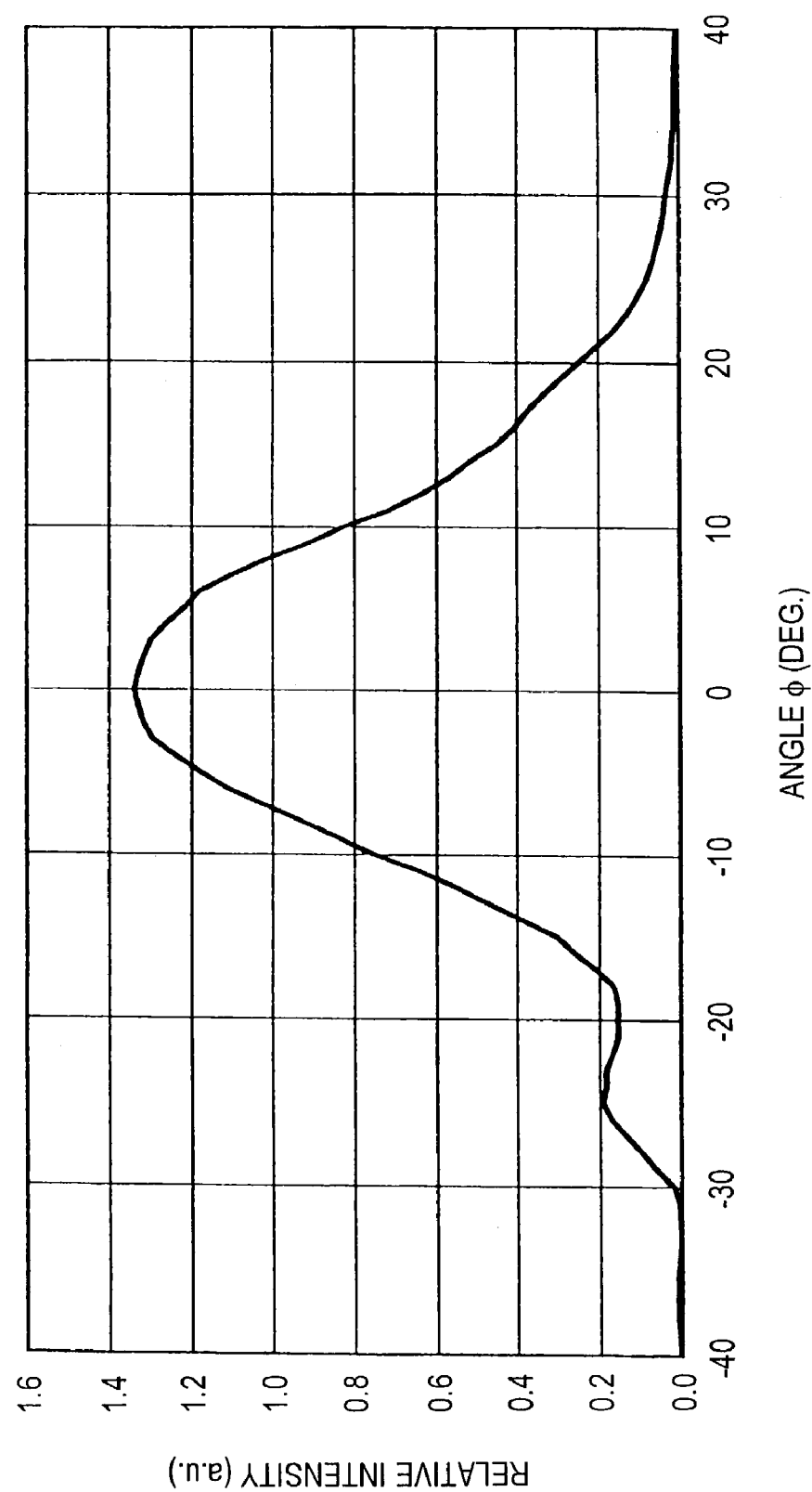
FIG. 37 is a diagram showing the directivity in the φ-direction of light transmitted through the prism sheet.

FIG. 37 shows the directivity in the φ direction of light transmitted through the prism sheet 56. The abscissa axis represents the angle φ measured from the z axis and the ordinate axis represents the light intensity. This was a simulation result achieved on the basis of a prism sheet 56 in which the inclination angle δ of the slope surface (incident face) 57 nearer to the light emitting portion 33 was equal to 74°, the inclination angle ε of the lower portion of the slope surface 58 remoter from the light emitting portion 33 was equal to 56°, the inclination angle ζ of the upper portion of the slope surface 58 concerned was equal to 59°, the height T2 of the prism portion was equal to 31.2 μmm, and the height T1 of the slope surface of the upper portion extending upwardly from the protruding position of the slope surface 58 remoter from the light emitting portion 33 was equal to 18.7 μm. According to FIG. 37, the half-value width in the φ direction is Δφ/2=±11°, and the full width at half maximum was reduced by 25% as compared with the case where the slope surface 58 was not bent. Furthermore, the amount of light contained in the range of the full width at half maximum Δφr=20° is equal to 48% of the total light amount, and the efficiency in the vertical direction is excellent.

Figure 38:
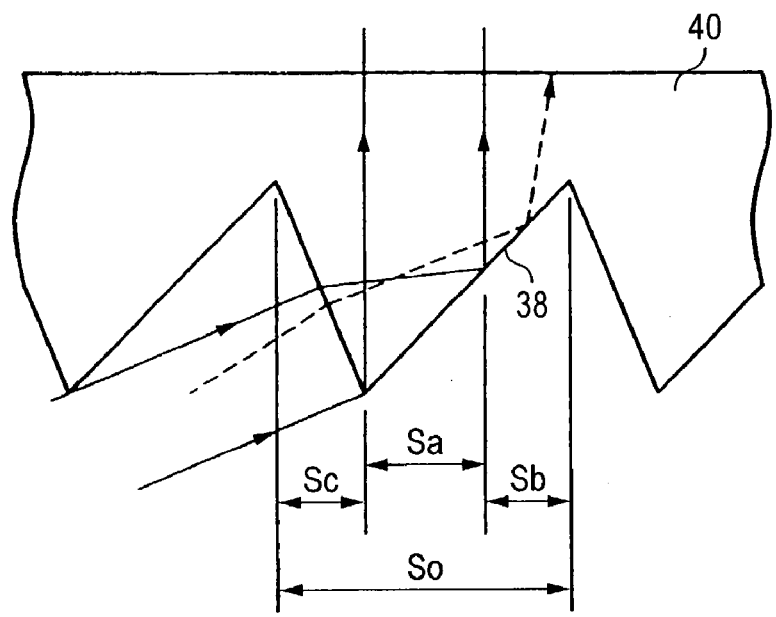
FIG. 38 is a diagram showing the behavior of light in the prism sheet in which a slope surface far away from the light emitting portion is flat.

The following reason may be considered for this result. In the case where the slope surface 38 (reflection face) remoter from the light emitting portion 33 is flat like the first embodiment, only an area Sa is viewed as shining and the other areas Sb, Sc look dark as shown in FIG. 38 when the prism sheet 40 is viewed from the vertical direction. In addition, light impinging against the area Sb of the slope surface 38 is deflected in an oblique direction as indicated by a broken line of FIG. 38, thereby inducing radial luminance unevenness or reduction in brightness in the vertical direction. Accordingly, in the case of the prism sheet 40 as shown in FIG. 38, the rate (Sa/So) of the area from which light is vertically emitted was equal to only 38% (So=Sa+Sb+Sc).

Figure 39:
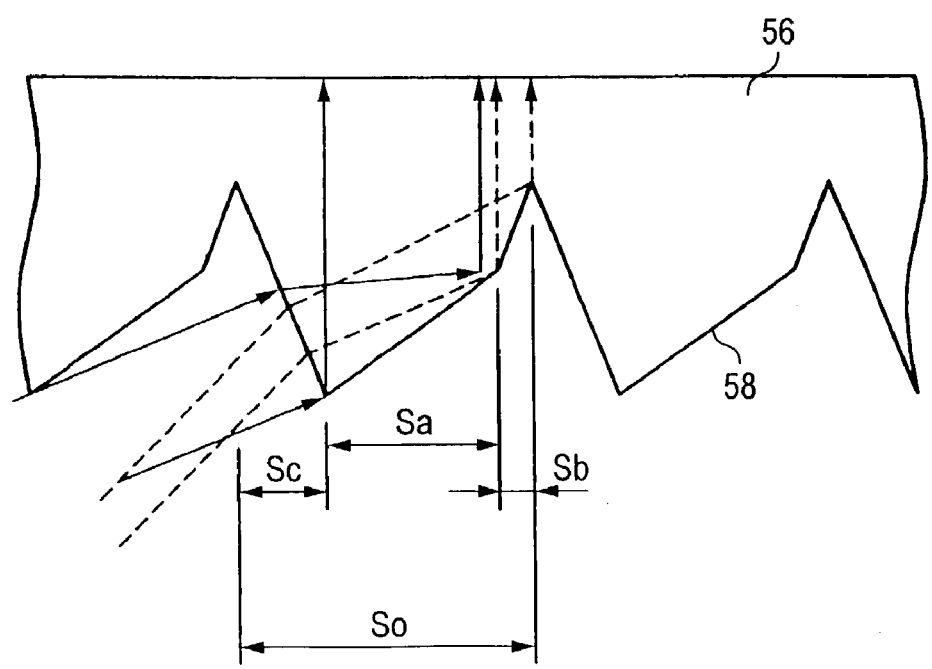
FIG. 39 is a diagram showing the behavior of light in the prism sheet of FIG. 36 in which a slope surface far away from the light emitting portion is crooked.

On the other hand, when the slope surface 58 is bent like the prism sheet 56 of this embodiment, light impinging against the area Sb of the slope surface 58 is also deflected in the vertical direction as indicated by a broken line of FIG. 39, so that the problems such as the luminance unevenness, the reduction in brightness in the vertical direction, etc. can be overcome. That is, the area which looks shining through the sight from the vertical direction of the prism sheet 56 can be expanded to Sa and Sb, thereby suppressing the radial luminance unevenness and the reduction of the efficiency in the vertical direction. According to the prism sheet 56 as described above, the rate of the shining area is represented as follows:

(Sa+Sb)/So =69% (So=Sa+Sb+Sc).

When the light transmitted through the prism sheet and the uneven diffusion plate is viewed from the vertical direction of the surface light source device, if the area of the shining region exceeds 50% (preferably, 60%), it means that a remarkably preferable characteristic as the surface light source device could be achieved. Therefore, such a prism sheet provides an excellent characteristic.

Figure 40:
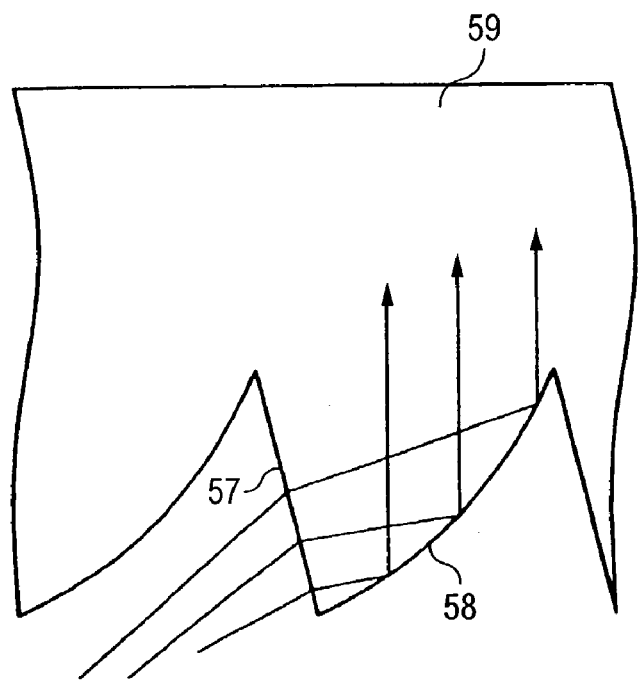
FIG. 40 is a partially-broken cross-sectional view showing a prism sheet having a different sectional shape.
Figure 41:
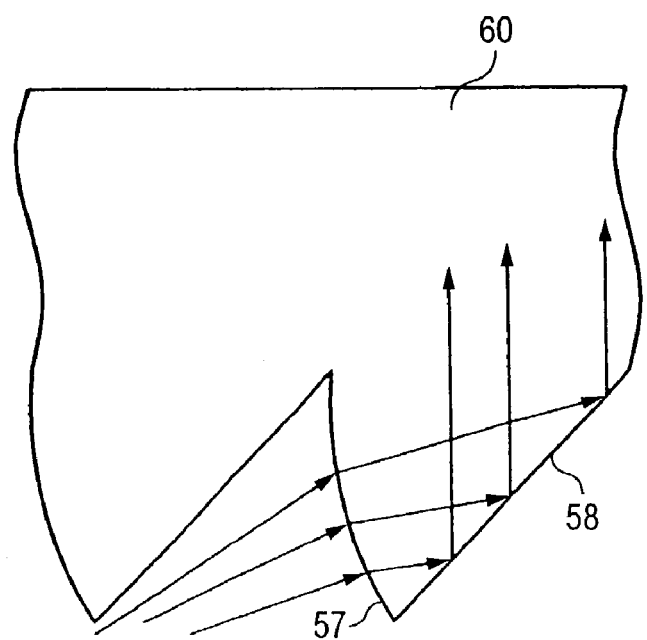
FIG. 41 is a partially-broken cross-sectional view showing a prism sheet having another different section shape.

Various structures other than described above may be considered as the structure of the prism sheet to increasing the amount of light emitted in the vertical direction. FIG. 40 shows a prism sheet 59 in which the slope surface 58 remoter from the light emitting portion 33 is bent to have a curved surface. Further, by bending the slope surface 57 nearer to the light emitting portion 33 in the convex shape like a prism sheet 60 shown in FIG. 41, the area of the region shining in the vertical direction can be increased.

Figure 42:
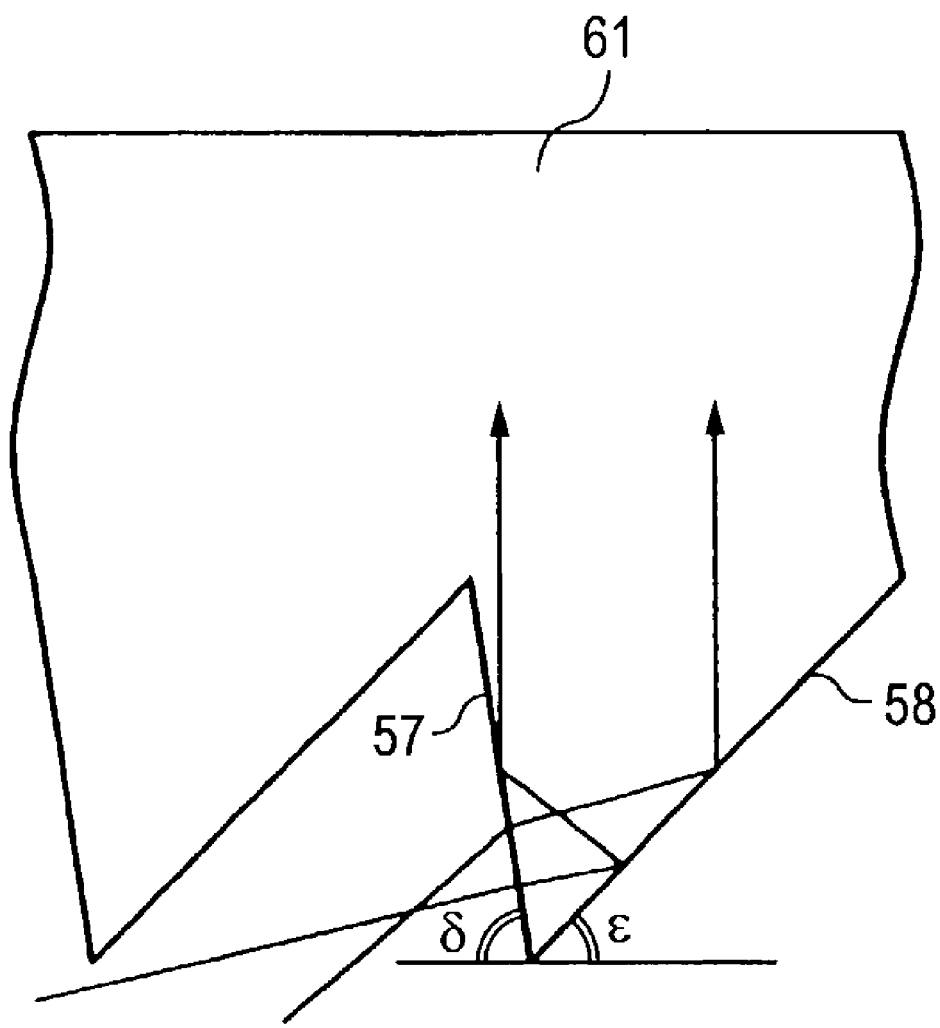
FIG. 42 is a partially-broken cross-sectional view showing a prism sheet having a still another different section shape.
Figure 43:
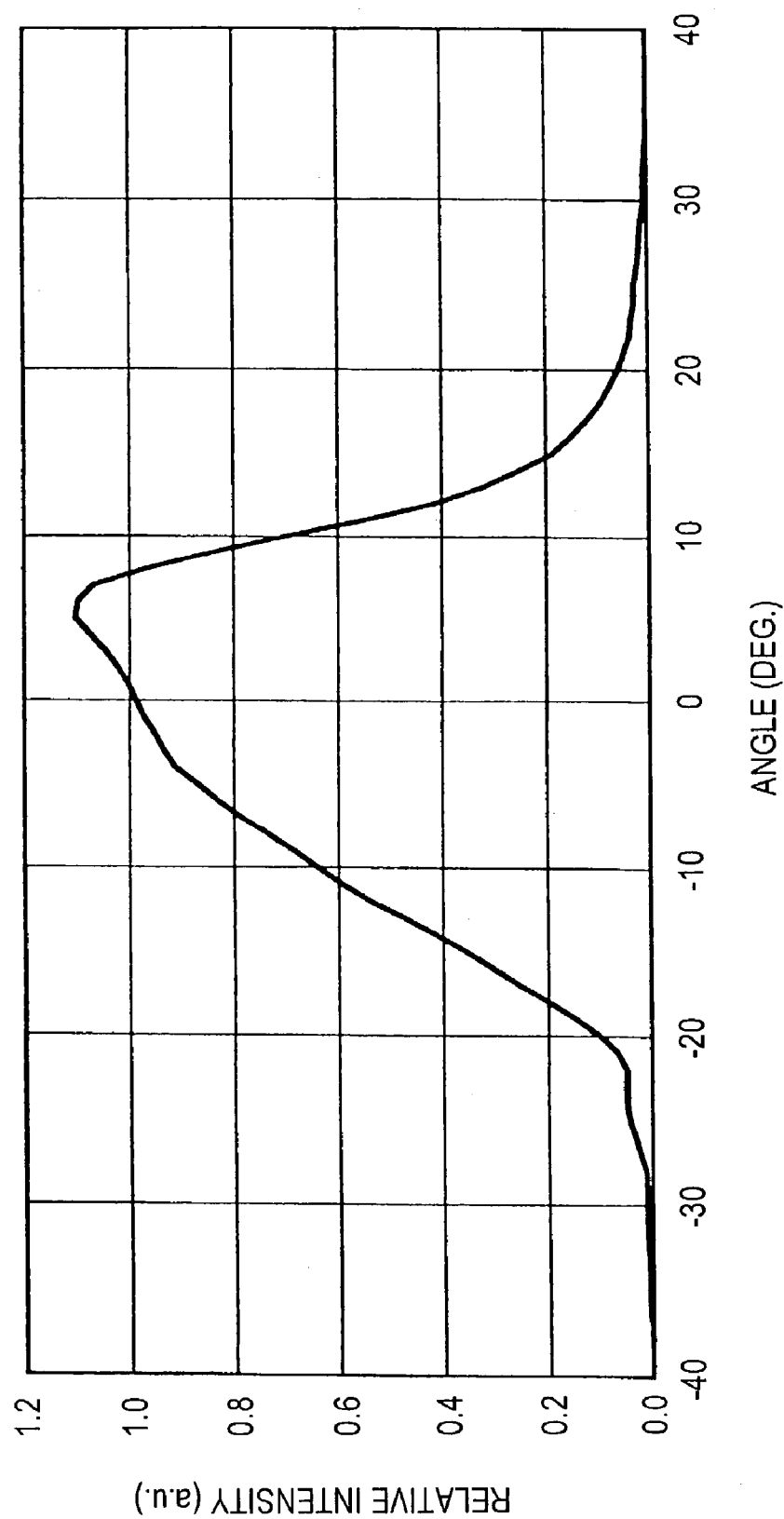
FIG. 43 is a diagram showing the directivity characteristic of light transmitted through the prism sheet.

Furthermore, by increasing the inclination angle ε of the slope surface 58 remoter from the light emitting portion 33 like a prism sheet 61 shown in FIG. 42, light reflected from the slope surface 58 to the light emitting portion (33) side is reflected from the slope surface 57 nearer to the light emitting portion 33 again to thereby deflect the light in the vertical direction, whereby the area of the region shining in the vertical direction can be increased. For example, when the inclination angle ε of the slope surface 58 remoter from the light emitting portion 33 is set to 56° and the inclination angle δ of the slope surface 57 nearer to the light emitting portion 33 is set to 85°, the directivity characteristic in the φ direction is as shown in FIG. 43, and the half-value width thereof (Δφ/2) is equal to 11.5°. This means that the half-value width is reduced by 21% as compared with the original case. Furthermore, the amount of light contained in the range of the full width at half maximum (Δφ)=20° is equal to 51% of the total light amount, and the light using efficiency is enhanced. Still furthermore, the area rate of the region which looks shining when viewed from the vertical direction is increased to 82%.

The light source (not shown) disposed in the surface light source device having the prism sheet of the above-described embodiment is not limited to a point light source, and it may be a linear light source.

When plural point light sources are arranged or a linear light source is disposed (however, excluding a case where much light is also emitted to the light source as disclosed in Japanese Laid-open Patent Application No. Hei-11-8411), the prism described above is effective in some cases, for example, when one directivity is required to be intentionally narrowed. Accordingly, the present invention is not limited to the light guide plate for radially spreading light emitted from a point light source and then emitting the light from the light emission face as indicated in the first embodiment.

(Liquid Crystal Display Device)

Figure 44:
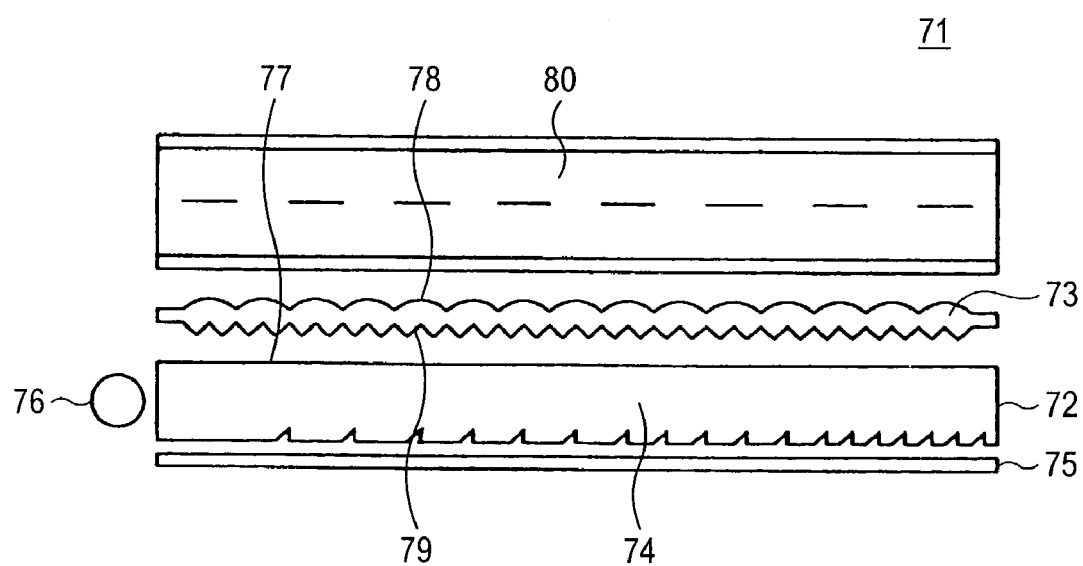
FIG. 44 is a schematic cross-sectional view showing the construction of a liquid crystal display device.

FIG. 44 is a schematic cross-sectional view showing the structure of a liquid crystal display device using the surface light source device according to the present invention. The liquid crystal display device 71 comprises a transmission type liquid crystal display panel 80 and a surface light source device 72 according to the present invention, and the surface light source device 72 comprises a diffusion prism sheet 73, a light guide plate 74, a reflection plate 75 and a point-light-source type light emitting portion 76.

Light emitted from the light emitting portion 76 is introduced into the light guide plate 74 and spread to the overall area in the light guide plate 74, and then emitted from the light emission face 77 of the light guide plate 74 substantially along the light emission face. The light emitted from the light guide plate 74 is transmitted through the uneven diffusion plate 78 of the diffusion prism sheet 73 to be deflected in the vertical direction to the surface light source device 72, and the directivity angle is spread by the prism sheet 79 of the diffusion prism sheet 73, thereafter illuminating the liquid crystal display panel 80.

As a result, the luminance unevenness hardly occurs in the surface light source device 72, and images on the screen of the liquid crystal display device 71 are easily viewable. Furthermore, the difference between the directivity in the direction of the broad directivity angle and the directivity in the direction of the narrow directivity angle can be reduced keeping the directivity angle in a relatively narrow range. Therefore, the images on the screen of the liquid crystal display device 71 are easily viewable from the front side, however, they are hardly viewable from the oblique direction, so that the directivity suitable for cellular phones, etc. can be achieved. Furthermore, since the difference in directivity in both the directions is small, the images on the screen are easily viewable from any direction.

According to the surface light source device of the present invention, particularly, according to the surface light source device using a point light source, the difference between the directivity angle in the broad-directivity direction and the directivity angle in the narrow-directivity direction can be reduced by spreading light in the narrow-directivity direction while the directivity of light emitted substantially vertically from the surface light source device is kept narrow as a whole. As a result, the radial luminance unevenness hardly occurs in the surface light source device. Furthermore, when the surface light source device is used in a liquid crystal display device, light can be collected to the front side to enhance the brightness at the front side, thereby making images on the screen easily viewable from any direction.

What is claimed is:

1. A surface light source device comprising
  a point light source,
  a light guide plate for spreading light incident from the point light source in a plane shape and then emitting the light from a light emission face thereof and
  a prism sheet disposed so as to face the light emission face of the light guide plate,
  wherein said light guide plate has means for deflecting light in said light guide plate on only a plane which is vertical to the light emission face and contains the point light source and emitting the light substantially along the light emission face and in a direction opposite to said point light source, and said prism sheet has a function of deflecting the light emitted from the light emission face in a direction perpendicular to the light emission face,
    wherein said means for deflecting the light in said light guide plate is constructed by an uneven pattern having a light deflecting face, and an inclination angle of the light deflecting face on the plane which is vertical to the light emission face and contains the point light source is set to be substantially fixed in said light guide plate,
  wherein said light guide plate has means for emitting light from the light emission face substantially along the light emission face and in a direction opposite to the light source, and said prism sheet has a region in which the light emitted from the light emission face is deflected to a direction vertical to the light emission face, the area of the region occupying 50% or more of said prism sheet when viewing said prism sheet from the direction perpendicular to said prism sheet,
  wherein plural prisms each of which has an incident face and a reflection face crooked in a projecting shape are arranged on a surface of said prism sheet which faces said light guide plate, and after light emitted from said light guide plate is incident from the incident face into each prism, the light is reflected from the substantially whole area of each reflection face and deflected in the direction perpendicular to said prism sheet, and in the prism sheet, a slope surface (reflection face) more remote from the light emitting portion in the slope surfaces constituting the prism in section is bent so as to project from a midpoint.

2. A surface light source device comprising
  a light source,
  a light guide plate for spreading light introduced from the light source in a plane shape and emitting the light thus spread from a light emission face thereof, and
  a diffusion plate disposed so as to face the light emission face of the light guide plate,
  wherein the directivity of light transmitted through said diffusion plate with respect to vertical incidence has at least one local maximum value within the angular range of 20 degrees at each of both the sides of the direction vertical to said diffusion plate,
  wherein said diffusion plate comprises plural substantially-conical uneven portions which are arranged,
  a prism sheet disposed so as to face the light emission face of the light guide plate, and
  a diffusion plate is arranged on the far side of the side of a prism sheet disposed so as to face the light emission face of the light guide plate.

3. A diffusion plate for spreading light from a light emission face of a light guide plate, the diffusion plate including plural uneven portions which are long in one direction,
  wherein a direction of a long side of each of said uneven portions is oriented toward a predetermined point, and
  a direction of a short side of each of said uneven portions is oriented toward a concentric direction with respect to said predetermined point, and
  wherein light from the light emission face passing through said uneven portions is substantially perpendicular to the diffusion plate and is spread more greatly in the direction of the short side than in the direction of the long side.

4. A surface light source device comprising:
  a light source;
  a light guide plate for spreading light introduced from said light source in a planar shape and then emitting the light from a light emission face; and
  said diffusion plate as claimed in claim 3 which is disposed so as to face the light emission face of said light guide plate.

* * * * *